United States Patent [19]

Sugahara et al.

[11] 3,892,577
[45] July 1, 1975

[54] WHITE PIGMENT EXCELLING IN RESISTANCE TO FLAME AND CORROSION

[75] Inventors: Yujiro Sugahara, Tokyo; Yoshibumi Noshi; Hiroyuki Naito, both of Tsuruoka, all of Japan

[73] Assignee: Mizusawa Kagaku Kogyo Kabushiki Kaishi, Osaka, Japan

[22] Filed: Nov. 23, 1971

[21] Appl. No.: 201,483

[52] U.S. Cl............... 106/14; 106/15 AF; 106/299; 162/159; 252/309; 260/31.8 M; 260/31.8 XA; 260/29.2 B; 260/29.6 MM; 260/29.2 UA; 260/31.2 XA; 260/33.6 R; 260/33.6 UA; 260/37 EP; 260/37 M; 260/42.44; 423/69; 423/71; 423/315; 423/318

[51] Int. Cl....... C09d 5/08; C09d 5/14; C23f 11/18

[58] Field of Search......... 106/14, 15 AF, 299, 307; 252/309, 8.1; 23/19, 23, 105, 106, 109; 423/69, 71, 315, 318

[56] References Cited
UNITED STATES PATENTS

| | | | |
|---|---|---|---|
| 3,167,516 | 1/1965 | Brayton | 106/309 X |
| 3,558,273 | 1/1971 | Beck | 106/299 X |
| 3,630,592 | 12/1971 | Nielsen | 106/288 B X |
| 3,666,514 | 5/1972 | Yates | 106/299 X |

*Primary Examiner*—Joseph L. Schofer
*Assistant Examiner*—Herbert J. Lilling
*Attorney, Agent, or Firm*—Sherman & Shalloway

[57] ABSTRACT

A white pigment excelling in flame resistance as well as corrosion resistance, such white pigment consisting of a phosphate having the composition of the formula $$M^1O_2 \cdot xy \cdot (0.1 \sim 1.5 + mx/2) P_2O_5$$

wherein $M^1$ is an atom selected from the group consisting of silicon, titanium and zirconium, $Y$ is a member selected from the group consisting of a nitrogen-containing base and an oxide of the formula $$M^2O_{n/2}$$

where $M^2$ is a metal selected from the group consisting of alkali metals, alkaline earth metals, aluminum, lead and zinc, and $n$ is the valence of metal $M^2$, $x$ is a positive number up to 6, including 0, and $m$ is 1 when Y is a nitrogen-containing base and is $n$ when Y is $$M^2O_{n/2};$$

such phosphate containing at least 0.1 percent of a water-soluble component.

7 Claims, No Drawings

WHITE PIGMENT EXCELLING IN RESISTANCE TO FLAME AND CORROSION

This invention relates to a new white pigment excelling in resistance to flame and corrosion as well as a rust preventing paint containing this pigment and a method of preventing the rusting of metals using this rust preventing paint. More specifically, the invention relates to a white pigment composed of a specific silicon phosphate, titanium phosphate or zirconium phosphate and a paint composition containing this pigment.

While colloidal silica, the so-called white carbon, is known as being a filler which can inpart excellent attrition resistance to rubber or synthetic resins such as vinyl polymers, it is not quite fully satisfactory for such uses as a white pigment or for delustering of shaped resin articles e.g., fibers, because finely divided silica usually possesses transparency. Further, in manufacturing the foregoing silicic filler, a special operation is required for obtaining an extremely fine particle size. Therefore, there is the drawback that its cost of manufacture is inevitably high.

On the other hand, titanium dioxide has been known as being a white pigment whose covering power is most outstanding, but its degree of whiteness, especially its reflectance in the ultraviolet region, is not sufficiently high and, in addition it possesses the drawback that its price is also relatively high.

In view of the foregoing, the discovery of an inexpensive white pigment excelling in whiteness is being looked for in the pigment art.

On the other hand, as corrosion resistance pigments, red lead, lead powder, zinc dust, aluminum powder, zinc chromate, barium chromate, lead cyanamide and basic chromate have been known heretofore. These corrosion resistant pigments dissolved in a vehicle are being used as rust preventing paints, primers or wash primers. However, these rust preventing paints are still not quite satisfactory when considered from the standpoint of the perfect adhesion of these paints to the metallic substrate and the prevention of penetration of permeation of water, moisture or a corrosive gas between either the metallic substrate and the aforesaid paints or between these paints and the final coating applied thereover. On the other hand, the corrosion resistant pigments such as zinc chromate generally have a tendency to degrade the vehicle or binder substance, and therefore are still not satisfactory when it comes to forming a firm rust preventing coating on a metal.

Of the aforementioned corrosion resistant pigments, those possessing great corrosion resistance were in all cases those of either the lead type or chromic acid type. These corrosion resistant pigments impart a distinctive coloring to the surface of the metal, and accordingly there was the drawback that a paint film of sufficient thickness had to be provided over this rust preventing paint film to hide its color. In addition, since the aforesaid corrosion resistant pigments contain lead and chromates which are harmful to the human body, there was the serious problem that workers handling these rust preventing paints are exposed to a very serious health hazard.

Further, in the case of the flame retardant paint and flame retardant resin-coated shaped articles, it has been known to incorporate a flame retardant composed of various phosphates. The property required of these flame retardants was that of forming a noncombustible foam on exposure of the foregoing coating composition to flame and that of carbonizing the coating composition. While the conventional flame retardants composed of ammonium phosphates form foams on being exposed to flame and by liberating free phosphate excel in the function of carbonizing combustibles, these compounds are on the whole water-soluble and have the drawback that they not only lack durability but also lack dispersibility, since they tend to aggregate. In order to improve on this drawback, a proposal has already been made to use ammonium polyphosphate as the flame retardant, but a shortcoming of ammonium polyphosphate is that it possesses no special characteristics which make it valuable for use as a filler or pigment. For example, in the case of ammonium polyphosphate, secondary aggregation readily sets up and therefore it is difficult to disperse it in paint at a particle size in which a pigment is usually used. Accordingly, the properties of a film coating obtained by the use of a coating composition containing ammonium polyphosphate are generally poor.

We found that a white powder composed of silicon phosphate, titanium phosphate or zirconium phosphate and containing a water-soluble component of a specific quantitative range while excelling in whiteness, and especially reflectance in the ultraviolet region, also demonstrates marked superiority in flame resistance and the property of preventing corrosion.

It is therefore a primary object of the present invention to provide a new white pigment which, while being white in color, excels in flame resistance as well as corrosion resistance, and also a paint composition containing this white pigment.

Another object of the invention is to provide a non-lead or nonchromic acid type rust preventing pigment, which is white in color and moreover excels in its property of preventing the rusting of metals, and also a rust preventing paint composition containing this rust preventing pigment.

A further object is to provide a white pigment which, while containing the water-soluble component necessary for the rust preventing and flame resistant effects, does not have the tendency to aggregate, with the consequence that it can be readily dispersed in a vehicle or resin.

A white pigment excelling in flame resistance as well as corrosion resistance is thus provided in accordance with the present invention, such white pigment being composed of a phosphate having the composition of the formula $$M^1O_2 \cdot xY \cdot \left(0.1 \sim 1.5 + \frac{mx}{2}\right) P_2O_5 \qquad (1)$$

wherein $M^1$ is silicon, titanium or zirconium,

Y is a nitrogen-containing base or an oxide of the formula $$M^2O_{n/2}$$

where $M^2$ is an alkali metal, an alkaline earth metal, aluminum, lead or zinc and $n$ is the valence of the metal $M^2$, $x$ is a positive number up to 6, including 0, and $m$ is 1 when Y is a nitrogen-containing base and is $n$ when Y is $M^2O_{n/2}$;

such phosphate containing at least 0.1 percent of a water-soluble component.

COMPOSITION AND PROPERTIES OF THE PIGMENT

The white pigment of the present invention may be that consisting of either silicon phosphate, titanium phosphate or zirconium phosphate used singly, or it may be a combination of these phosphates or a complex of these phosphates with other phosphoric compounds.

In one embodiment of the invention, a white pigment excelling in flame resistance as well as corrosion resistance, which is composed of a phosphate having the formula $$SiO_2.xY.\left(0.1\sim1.5 + \frac{mx}{2}\right)P_2O_5 \quad (I-1)$$

wherein

Y is a nitrogen-containing base or an oxide of the formula $$M^2O_{n/2}$$

where $M^2$ is an alkali metal, alkaline earth metal, aluminum, lead or zinc and $n$ is the valence of the metal $M^2$, $x$ is a positive number up to 6, including 0, and $m$ is 1 when Y is a nitrogen-containing base and is $n$ when Y is $$M^2O_{n/2}$$

The invention silicon phosphate usually consists of one of the silicon phosphates $2SiO_2.P_2O_5$, $3SiO_2.2P_2O_5$ or $SiO_2.P_2O_5$ or a mixture of these compounds, or further a mixture of these silicon phosphates with silicic anhydride, silicic salts and/or other phosphates. While the foregoing silicon phosphate compounds are substance which are known per se, nothing at all has been known hitherto as to what properties were possessed by these compounds or how valuable these substances were. Further, the silicic compounds such as silica, lead silicate, calcium silicate or aluminum silicate are usually transparent, and hence while it was possible for these silicic compounds to become a filler which provides a substrate with transparency, there was no prior knowledge whatsoever that these compounds could become a white pigment is provided by which nontransparency is imparted to a substrate. However, we found to our surprise that of the various silicic compounds, the silicon phosphates or mixtures predominantly of silicon phosphates were unique in that they possessed nontransparency and excelled in their whiteness, and especially in their reflectance in the near ultraviolet and ultraviolet regions, and therefore that they could become a white pigment possessing new properties as compared with the conventional white pigments.

The results obtained when the invention silicon phosphate white pigment ($2SiO_2.P_2O_5$) and the commercially available rutile type titanium dioxide and white carbon (finely divided silica) are compared as to their whiteness are shown in Table 1, below. It is apparent that in whiteness and especially the reflectance in the near ultraviolet and ultraviolet regions, the invention pigment demonstrates a marked superiority.

Table 1

| Pigment | Degree of Whiteness* (Percent Reflectance at the Several Wavelengths) | | | | | | |
|---|---|---|---|---|---|---|---|
| | 320mμ | 350mμ | 400mμ | 450mμ | 500mμ | 550mμ | 600mμ |
| Invention silicon phosphate white pigment | 37.5 | 80.7 | 98.2 | 100.8 | 101.8 | 101.9 | 102.0 |
| Rutile type titanium dioxide | 2.9 | 7.7 | 42.8 | 92.8 | 93.7 | 95.7 | 96.0 |
| Finely divided silicic acid anhydride | 16.8 | 30.9 | 73.0 | 79.2 | 83.1 | 84.6 | 86.8 |

*The degree of whiteness was determined by the reflectance measurement method by means of the powder technique; using a spectrophotometer. An alumina ($Al_2O_3$) sheet was used as the standard, and on the basis of the alumina sheet as 100 the reflectance in percent was determined for the several wavelengths.

When in the invention silicon phosphate pigment (letting $SiO_2$ represent the silicic component and $P_2O_5$ represent the phosphoric component) the molar ratio of $P_2O_5$ relative to one mol of $SiO_2$ is less than 0.1, the desired degree of whiteness and nontransparency cannot be obtained. Neither can flame resistance and corrosion resistance be expected on the other hand, when the molar ratio of $P_2O_5$ to $SiO_2$ becomes greater than 1.5, and no further enhancement of the whiteness, flame resistance and corrosion resistance can be expected. Instead, the chemical stability of the pigment itself suffers. Thus, when considered from the whiteness and nontransparency of the pigment that is obtained, a molar ratio of $SiO_2:P_2O_5$ in the range of 1:0.2–0.8 is especially to be preferred in the present invention.

The alkali metals such as sodium and potassium, alkaline earth metals such as calcium and magnesium, or such metals as aluminum, lead or zinc may be present in the invention silicon phosphate pigment in the form of phosphates or silicates, or also as double salts. From the standpoint of the whiteness and nontransparency of the pigment, these metals, in terms of oxides, should be present in a molar ratio of $MO_{n/2}$ to $SiO_2$, of no greater than 6, and preferably no greater than 3. When these metallic components are present in the pigment, the phosphoric component ($P_2O_5$) may be present in the amount in excess of that hereinbefore indicated to the extent of not greater than $n/2$ mol per mol of $MO_{n/2}$.

We found that of the pigments represented by the foregoing formula (I-1) a solid ammonium phosphate silicate containing as its requisite constituents a silicic component, a phosphoric component and an ammoniacal nitrogen component and in which the molar ratio of the silicic component ($SiO_2$) to the phosphoric component ranges from 0.2 to 5 and the molar ratio of the ammoniacal nitrogen component ($NH_3$) to the phosphoric component ($P_2O_5$) ranges from 1 to 6 was greatly superior in its flameproofness.

It is not quite clear as yet as to whether this flameproof pigment of the present invention is a single substance or so-called mixture. However, in view of the fact that this flameproof pigment of the invention generally exhibits an X-ray diffraction pattern characteristic of ammonium phosphate as well as that the flameproof pigment prepared by using either triammonium phosphate or diammonium phosphate and blending with silica exhibits an X-ray diffraction pattern characteristic of diammonium phosphate or monoammonium phosphate, respectively, it is believed that this flameproof pigment of the invention is an intimate mixture of ammonium phosphate and either ammonium silicate or ammonia-adsorbed silicate.

Especially suitable flameproof pigments of the invention are those consisting of a solid powder having the following X-ray diffraction patterns:

A. That having the following X-ray diffraction pattern:

| d(A) | I/Io |
|---|---|
| 5.04 | 100 |
| 3.36 | 75 |
| 3.06 | 55 |
| 5.30 | 50 |
| 3.17 | 45 |
| 3.75 | 40 |

B. That having the following X-ray diffraction pattern:

| d(A) | I/Io |
|---|---|
| 3.06 | 100 |
| 5.34 | 90 |
| 3.76 | 80 |
| 2.00 | 55 |
| 2.66 | 30 |
| 2.37 | 17 |

C. That having the following X-ray diffraction pattern:

| d(A) | I/Io |
|---|---|
| 6.02 | 100 |
| 5.43 | 70 |
| 3.23 | 65 |
| 3.81 | 55 |
| 3.49 | 50 |
| 3.98 | 40 |

When a differential thermal analysis of the invention ammonium phosphate silicate flameproof pigment is carried out, it has an endothermic peak accompanying the separation of ammonia at a temperature of usually 120° to 260°C., and it itself has the foam-forming ability that is required of a heat resistant coating composition. In addition, this compound liberates phosphoric acid concomitant with the separation of the ammonia. This phosphoric acid is effective in carbonizing the combustibles. Thus the ammonium phosphate silicate renders the combustibles of the coating composition flame retardant. At the same time, the liberated phosphoric acid reacts with silica at a still higher temperature to completely carry off the combustion heat (the endothermic reaction of the free phosphoric acid and silica appears in the differential thermal analysis as a marked endothermic peak at the temperature 360°–500 °C.).

The excellent self-extinguishing property of the invention ammonium phosphate silicate can be thus explained.

In another embodiment of the invention, a white rust preventing pigment is provided consisting of a titanium phosphate of the formula $$TiO_2 \cdot (0.2 \sim 1.5) P_2O_5 \qquad (I-2),$$

such titanium oxide containing at least 0.1 percent of a water-soluble component and having a pH of not more than 3.5 when made into a 10 percent aqueous suspension.

In a still another embodiment of the invention, a white pigment is provided consisting of a zirconium phosphate of the formula $$ZrO \cdot (0.4 \sim 1.0) P_2O_5 \qquad (I-3)$$

such zirconium phosphate containing at least 0.1 percent of a water-soluble component.

The atomic ratio of zirconium or titanium to phosphorus in the zirconium phosphate or titanium phosphate may be in a broad range. However, generally speaking, letting the zirconium or titanium component in the phosphate be represented by $MO_2$, where M is either zirconium or titanium, and the phosphoric component be represented by $P_2O_5$, it is desirable that $P_2O_5$ is at least 0.1 mol, and preferably at least 0.4 mol, per mol of $MO_2$, and moreover not more than 1.5 mols, and preferably not more than 1 mol, per mol of $MO_2$. That is, with the amount of the phosphoric component below 0.1 mol marked rust preventing and flameproofing effects cannot be expected. On the other hand, even though the phosphoric component is present in an amount greater than 1.5 mols, no appreciable enhancement in the rust preventing and flameproofing effects can be expected since there is a limit to the improvement that is attainable. In addition, the chemical stability of the rust preventing pigment itself suffers. The titanium phosphate or zirconium phosphate which are most desirable for achieving the objects of the invention are those in which the molar ratio $MO_2:P_2O_5$ has a value of about 1:1.

It is most important from the standpoint of preventing rust and resisting flame that in the invention phosphatic white pigment the water-soluble component contained is in an amount of at least 0.1 percent and that in the case of titanium phosphate the pH of a 10 percent aqueous suspension thereof is not more than 3.5. That is, a phosphatic pigment which does not satisfy either one or both of these conditions does not have the excellent rust preventing property such as demonstrated by the phosphatic pigment in accordance with the present invention.

Titanium phosphate itself has been known to be a white pigment excelling in whiteness, and especially in its reflectance in the ultraviolet region (e.g. see British Pat. No. 994,669). However, the known white pigments consisting of titanium phosphate have in all cases been practically completely insolubilized by calcining in order to increase their chemical stability, and thus the titanium phosphate does not contain a water-soluble component in an amount of at least 0.1 percent as in the case of titanium phosphate used in the present invention. On the other hand, it is possible in accordance with the present invention, as hereinafter fully described, to adjust the content of the water-soluble component to at least 0.1 percent by a suitable choice of the drying and calcining conditions of the phosphates such as titanium phosphate. Consequently, an excellent rust preventing property as well as flame resistance can be imparted to the phosphate.

However, a content of the water-soluble component in excess of 24 percent is not desirable, since this brings about a decline in the properties of the phosphatic pigment. Further, when the acidity of the titanium phosphate, i.e., the pH of a 10 percent aqueous suspension thereof, becomes smaller than 1, this also is undesirable, since this tends to degrade the vehicle.

In the following Tables 2 and 3, the relationship between the calcining temperature, the amount of the water-soluble component and the acidity are illustrated in relation to the rust preventing property obtained, when the calcining temperatures of titanium phosphate and silicon phosphate are varied.

The evaluation of the rust preventing property was by means of the following simple experimental method.

Water was added to finely divided titanium phosphate and silicon phosphate in a weight ratio of 1:1, followed by thorough mixing, whereupon a white paste was obtained.

As the test sheet, the commercially available iron sheet having a protective film of vinyl chloride resin on both surfaces was used after being stripped of the resinous film. To the inner surface of this iron sheet (thickness 0.32 mm) freshly stripped of its resinous film coating the white paste obtained above was applied to a thickness of 60–40 microns, thus forming a film coating on the iron sheet.

As controls, test sheets were prepared in a similar manner by applying to the inner surface of iron sheets calcium phosphate and zinc phosphate as the phosphates, basic lead silicate and white carbon as the silicate, and red lead as the commercially available rust preventing pigment, thus forming a film coating on the iron sheets. The rust preventing effect of these latter film coatings was compared with that of the film coating of the foregoing white paste of titanium phosphate and silicon phosphate.

After the film coatings were formed on the test iron sheets, as hereinabove described, the sheets were hung inside a closed chamber held at 40°C. and relative humidity 100 percent and left therein for 100 hours. After the passage of 100 hours, the test sheets were removed from the closed chamber and the film coated surface of the iron sheets were judged as to their conditions of rust formation. The ratings A, B, C, D and E were awarded depending upon the conditions of the rust as defined below.

A: No rust noted at all; there being practically no change as compared with the time the sheet was applied the coating.

B: Rust on the order of pinholes seen.

C: Rusting of parts of the sheet noted, and cracks and bulging noted in parts of the film coating.

D: Rust formation is noted in a major part of the sheet, and peeling of a major part of the film coating seen.

E: Rupture of the film coating and rust formation noted over the whole substrate.

The other values given in Tables 2 and 3 were determined in the following manner.

1. Water-soluble component.

Twenty grams of the pigment powder is placed in a 100-ml graduated flask, followed by addition of about 70 ml of water and boiling for 5 minutes. After cooling of the mixture water is added up to the calibration mark, and the mixture is shaken well and then allowed to stand for 1 hour. Next, the contents of the flask is filtered with a dry filter paper. After discarding the first 20-ml portion, the next 50ml of clear liquid are taken in a weighing bottle for evaporative drying use and evaporated to dryness. Next, after drying for 1 hour at 105°–110°C. the residue obtained by evaporation, it is weighed, after which the percentage of the water-soluble component is calculated from the amount of the so obtained residue.

2. pH of 10 percent aqueous suspension.

A 10 percent aqueous dispersion well dispersed by thorough shaking is prepared. After allowing this suspension to stand for 1 hour, its pH is determined with a pH meter.

3. Degree of whiteness.

A spectrophotometer is used and the reflectance (percent) of the several wavelengths is measured by the powder technique. An alumina sheet is used as the standard sheet and the numerical values obtained on the basis of the alumina sheet at 100 are used to indicate the whiteness.

4. Covering power.

The covering power is determined in accordance with procedure (a) for measuring the covering power of the Pigment Testing Method 6 of JIS K-5101-1964. Three milliliter of boiled linseed oil are added to 3 grams of the sample, and the mixture is submitted to a 25-rotation kneading operation with a Hoover type muller four times, thus being rendered into a pasty state. The covering power is then measured with a cryptometer, using the so treated sample. The graduation (mm) at which the boundary line starts to become visible on the dial of the cryptometer is the value by which the covering power is indicated. The smaller this value, the greater the covering power.

Table 2

PROPERTIES OF VARIOUS TITANIUM PHOSPHATES

| Example No. | Conditions of Preparation of Titanium Phosphate | | | Water-Soluble Component (wt%) | pH of 10% Aq. suspension | Degree of Whiteness (% Reflectance) | | | Covering Power (mm) | Rating of Rust Preventing Property |
|---|---|---|---|---|---|---|---|---|---|---|
| | Molar Ratio (n) $TiO_2 \cdot nP_2O_5$ | Treatment Temperature (°C.) | Treatment Time (hrs.) | | | Wavelength (mμ) | | | | |
| | | | | | | 350 | 400 | 500 | | |
| 1 | 2 | 450 | 4 | 17.20 | 0.5 | 85.0 | 103.0 | 105.0 | 30 | A |
| 2 | 2 | 600 | 4 | 6.55 | 1.4 | 90.2 | 103.0 | 105.0 | 25 | A |
| 3 | 2 | 800 | 3 | 1.91 | 1.9 | 90.5 | 103.0 | 105.0 | 19 | A |
| 4 | 2 | 1000 | 2 | 0.56 | 2.4 | 91.0 | 103.0 | 105.0 | 17 | B |
| 5 | 1 | 200 | 4 | 2.90 | 0.8 | 39.2 | 93.2 | 101.0 | 37 | A |
| 6 | 1 | 400 | 4 | 2.55 | 1.2 | 60.0 | 101.0 | 101.0 | 25 | A |
| 7 | 1 | 600 | 3 | 0.75 | 1.9 | 65.3 | 102.0 | 102.0 | 20 | A |
| 8 | 1 | 850 | 3 | 0.07 | 3.7 | 80.7 | 102.0 | 105.0 | 18 | C |
| 9 | 1 | 1000 | 3 | 0.05 | 4.2 | 87.2 | 102.0 | 105.0 | 16 | C |
| 10 | 0.5 | 150 | 3 | 1.05 | 2.2 | 22.5 | 87.0 | 100.0 | 40 | A |
| 11 | 0.5 | 350 | 3 | 0.68 | 2.3 | 24.3 | 87.4 | 100.0 | 25 | A |
| 12 | 0.5 | 600 | 2 | 0.58 | 2.6 | 28.5 | 90.2 | 101.0 | 20 | B |
| 13 | 0.5 | 850 | 2 | 0.05 | 3.9 | 46.0 | 90.5 | 101.2 | 18 | C |
| 14 | 0.5 | 1000 | 2 | 0.04 | 4.5 | 50.3 | 90.2 | 100.5 | 16 | C |
| 15 | 0.3 | 100 | 1 | 0.20 | 2.4 | 21.0 | 90.0 | 100.0 | 30 | B |
| 16 | 0.3 | 400 | 1 | 0.13 | 2.9 | 37.5 | 91.0 | 100.5 | 20 | B |
| 17 | 0.25 | 100 | 1 | 0.17 | 2.5 | 20.5 | 90.2 | 100.0 | 25 | B |
| 18 | 0.25 | 400 | 1 | 0.11 | 3.0 | 39.0 | 91.5 | 101.0 | 18 | B |
| Control 1 | calcium phosphate [$Ca_3(PO_4)_2$] | | | 0.0025 | 12.59 | 92.1 | 102.2 | 102.0 | 100< | E |
| Control 2 | zinc phosphate [$Zn_3(PO_4)_2$] | | | insoluble | 7.59 | 27.3 | 89.8 | 92.7 | 100< | D |

Table 3

PROPERTIES OF VARIOUS SILICON PHOSPHATES

| Example No. | Conditions of Preparation of Titanium Phosphate | | | Water-Soluble Component (wt%) | pH of 10% Aq. suspension | Degree of Whiteness (% Reflectance) | | | Covering Power (mm) | Rating of Rust Preventing Property |
|---|---|---|---|---|---|---|---|---|---|---|
| | Molar Ratio (n) $SiO_2 \cdot nP_2O_5$ | Treatment Temperature (°C.) | Treatment Time (hrs.) | | | Wavelength (mμ) | | | | |
| | | | | | | 350 | 400 | 500 | | |
| 1 | 1 | 300 | 2 | 11.04 | 1.6 | 58.0 | 76.3 | 84.2 | 65 | A |
| 2 | 1 | 500 | 2 | 8.31 | 1.9 | 83.3 | 92.8 | 95.5 | 60 | A |
| 3 | 1 | 800 | 2 | 7.70 | 2.2 | 76.7 | 92.6 | 95.8 | 55 | A |
| 4 | 1 | 1000 | 2 | 5.74 | 2.7 | 68.0 | 94.0 | 95.5 | 45 | A |
| 5 | 0.5 | 300 | 2 | 4.69 | 2.6 | 55.0 | 70.1 | 81.6 | 70 | A |
| 6 | 0.5 | 500 | 2 | 3.00 | 2.7 | 74.3 | 87.2 | 91.7 | 60 | A |
| 7 | 0.5 | 800 | 2 | 2.64 | 2.8 | 67.6 | 91.2 | 94.5 | 55 | A |
| 8 | 0.5 | 1000 | 2 | 2.16 | 2.9 | 66.0 | 93.4 | 96.1 | 47 | A |
| 9 | 0.3 | 200 | 2 | 1.85 | 2.7 | 62.4 | 74.5 | 87.2 | 62 | A |
| 10 | 0.3 | 500 | do. | 1.22 | 2.9 | 64.3 | 77.8 | 91.5 | 57 | B |
| 11 | 0.2 | 200 | 2 | 1.03 | 2.8 | 59.2 | 71.6 | 85.0 | 60 | B |
| 12 | 0.2 | 500 | 2 | 0.95 | 3.0 | 60.3 | 72.1 | 86.7 | 55 | B |
| 13 | 0.2 | 800 | 2 | 0.41 | 4.1 | 61.8 | 72.9 | 88.2 | 55 | C |
| Control 3 | basic lead silicate (1.6 $PbO \cdot SiO_2$) | | | 0.07 | 6.8 | — | — | — | 100< | C |
| Control 4 | white carbon (predominantly finely divided $SiO_2$) | | | 0.002 | 6.9 | — | — | — | 100< | E |
| Control 5 | red lead ($Pb_3O_4$) | | | — | — | — | — | — | — | B |

It can be seen from the foregoing Tables 2 and 3 that by choosing the amount of water-soluble component contained in the titanium phosphate and silicon phosphate and the acidity such that they come within the hereinbefore indicated ranges an excellent rust preventing property can be obtained which is not only greatly superior to that of calcium phosphate, zinc phosphate, basic lead silicate and white carbon, which have been shown by way of comparison, but also superior to that of red lead, which is commercially sold as a rust preventing pigment. The invention phosphatic pigment of the foregoing formula (1) most preferably contains the water-soluble component in an amount of 0.6 to 20 percent.

The invention phosphatic pigment of formula I is usually used as particles of less than 20-micron diameter, and preferably less than 10 microns. A surprising fact is that the invention phosphatic pigment demonstrates no tendency to aggregate even when comminuted to finely divided particles of less than 5 microns. As previously indicated, the invention phosphatic pigment contains at least 0.1 percent, and preferably 0.6 to 20 percent by weight, of the water-soluble component. It is usually a difficult matter to comminute such a water-soluble component-containing solid substance, for example to a particle size less than 10 microns, and even if it were possible, the tendency to aggregation would be exceedingly great. However, in the case of the invention phosphatic pigment, this tendency to aggregation is exceedingly small even though it contains the water soluble component which is desirable for achieving the resistance to flame and corrosion.

The tendency to aggregation of a finely divided substance can be determined in the following manner. A finely divided substance which has passed through a sieve, of given mesh size is left standing for a given period of time in air of given humidity. This finely divided substance is then sieved with the same sieve and the amount of particles passing through the sieve is obtained. The invention phosphoatic pigment is one whose rate of aggregation is less than 50 percent, and particularly less than 10 percent, as calculated by the following formula $$Q = \frac{A-A'}{A} \times 100 \quad \text{(II)}$$

wherein $A$ is the weight of powder passing through a sieve of given mesh size, $A'$ is the weight of this powder passing through the same sieve after standing for 24 hours at room temperature in air of relative humidity 90 percent, and $Q$ is the rate of aggregation in percent.

PREPARATION OF PIGMENT

The invention white phosphatic pigment of the foregoing formula (I) can be prepared by a number of methods.

The invention white pigment of Formula (I-1) is manufactured by intimately commingling amorphous silica, silicates or earth minerals consisting predominantly of these materials with either oxyacids of phosphorus, anhydrides of oxyacids of phosphorus or the salts of oxyacids of phosphorus, and thereafter calcining the resulting mixture.

As the starting silicic component in the invention, amorphous silica, colorless silicate or earth minerals consisting predominantly of these components are used. Usable as the amorphous silica in the invention are the hydrosol of silica, hydrogel of silica, xerogel of silica and the amorphous calcined product of silica. The term "amorphous," as used herein, is that referred to in crystallography as a result of X-ray diffraction analysis.

On the other hand, the alkali metal, alkaline earth metal or aluminum salts of silicic acid can also be used. These are usable in the invention process in the form of either an aqueous solution, sol, gel, powder or crystal.

Of the foregoing silicates, especially preferred are sodium silicate, potassium silicate, magnesium silicate, calcium silicate, barium silicate and aluminum silicate.

Various mixtures of the hereinbefore described derivatives or the naturally obtained colorless clayey minerals consisting predominantly of amorphous silica and/or silicate can also be used in the invention. For example, a mixture containing silicic acid and aluminum silicate in various proportions is suitable as the starting silicic component in this invention. Further, the starting silicic component may contain some impurities to an extent that does not affect the whiteness of the material. For example, it may contain a small quantity of such metallic components of Al, Mg and Ca, such as acid-treated acid clay obtained by the treatment of acid clay with an acid, or diatomaceous earth which has been rendered pure white by treating the naturally obtained diatomaceous earth. Again, the colorless earth minerals such as the naturally produced zeolite, diatomaceous earth and high-grade kaolin can also be conveniently used in the invention. The term "earth minerals" as herein used, are meant to be the phyllosilicate stratiform bonded material (clayey minerals), the tectosilicate steric reticular bonded material and the natural noncrystalline silicates. Therefore, any silicic acid or silicate, which is produced as a by-product in the inorganic chemical and ceramic industries or is obtained as an intermediate or final product in these industries, can be used as the starting silicic material according to the invention.

On the other hand, as the starting oxyacids of phosphorus, any of the oxyacids of phosphorus such, for example, as orthophosphoric acid ($H_3PO_4$), metaphosphoric acid ($HPO_3$), pyrophosphoric acid ($H_4P_2O_7$), hexametaphosphoric acid [$(HPO_3)_6$], tripolyphosphoric acid ($H_5P_3O_{10}$), phosphorus acid ($H_3PO_3$) and hypophosphorus acid ($H_3PO_2$) can be used. Further, it goes without saying that this starting oxyacid of phosphorus can also be used in its anhydride form such as phosphorus pentoxide ($P_2O_5$). Further, as the colorless oxyacid salts of phosphorus, mention can be made of the alkali metal salts, ammonium salts, alkaline earth metal salts, zinc salts, lead salts or aluminum salts of the oxyacids of phosphorus.

According to the invention, the foregoing starting silicic component and starting phosphorus oxyacid component are intimately commingled. In this case the commingling of the two materials can be carried out by either the dry or wet method. For example, a starting silicic component in sol form or hydrogel form can be used, to which the phosphorus oxyacid component is added as an aqueous solution or in a slurry form to form an intimate blend; or the phosphorus oxyacid can be added as a liquid to the dried gel or powder of the starting silicic component. Further, the two starting materials may be mixed by dry-grinding when using a salt of the phosphorus oxyacids, but a still more intimate blend can be achieved by using either water or another liquid media.

While the proportion in which the startng silicic component and starting phosphorus oxyacid component are mixed varies considerably depending upon the classes of the starting meterials that are used, this does not matter so long as the final composition comes within the hereinbefore indicated range.

Next, according to the invention, the intimate blend of the starting silicic component and the starting phosphorus oxyacid component is calcined. While the calcining temperature will vary considerably depending upon the classes of the two starting materials, generally speaking, a temperature in the range of 200° to 1,000°C. is to be preferred. When considered from the standpoint of the whiteness the pigment to be obtained, a temperature of usually above 400°C. should preferably be used in calcining the aforesaid blend. When considered from the standpoint of the whiteness as well as stability of the pigment to be obtained, it is generally preferred that the calcining of the foregoing blend be carried out at a temperature exceeding 400°C. The calcining conditions should be suitably chosen so as to satisfy the hereinbefore indicated requirements, the temperature chosen being one above 200°C., and preferably between 400° and 1,000°C., and the time chosen being from 1–4 hours.

When the calcining of the blend consisting of the starting phosphoric component and starting oxyacid component is carried out with the addition of an inorganic halogen-containing compound such, for example, as a chloride, bromide or iodide of an alkali metal such as lithium, sodium or potassium; a chloride, bromide or iodide of an alkaline earth metal such as magnesium, calcium or barium; or a chloride, bromide or iodide of such metals as zinc, aluminum or tin, the amount of impure coloring components contained in the aforesaid blend can be reduced to a notable degree. The whiteness of the pigment can be improved conspicuously by the use of the inorganic halogen-containing compound at the rate of 0.01 to 0.3 mol, and especially 0.05 to 0.02 mol, per mol of $SiO_2$.

On the other hand, the aforesaid ammonium phosphate silicate type of flameproof white pigment can be prepared by intimately mixing, for example, a combination of the following materials:

a. a combination of reactive silica, phosphoric acid and an ammoniacal nitrogen compound;
b. a combination of reactive silica, ammonia-adsorbed silica and ammonium phosphate; or
c. a combination of silicon phosphate and an ammoniacal nitrogen compound, wherein the molar ratio of $SiO_2/P_2O_5$ falls in the range of 0.2 to 5, and preferably 0.5 to 3, and the molar ratio of $NH_3/P_2O_5$ is comes within the range of 1 to 6.

As to the starting silica material and phosphoric acid material, any of those mentioned hereinbefore can be used.

As the ammoniacal nitrogen compound, such compounds as urea, ammonium carbamate, guanyl urea, aminourea and biurea are usable, in addition to ammonia.

Instead of using phosphoric acid and the ammoniacal nitrogen compound separately, ammonium phosphate can be used as the starting material. As such ammonium phosphate, the mono-, di-, tri-ammonium orthophosphates, ammonium metaphosphate, as well as the ammonium salts of phosphorus oxyacid and also the P—O—P type ammonium phosphoric acid can be used. Again, instead of using silica and phosphoric acid separately, a silicon phosphate, e.g. that of the formula $$xSiO_2 \cdot yP_2O_5$$

wherein $x/y = 1-5$ can be used as the starting material.

The foregoing starting materials are brought into intimate contact at a temperature ranging from room temperature to 200°C. The conditions under which this contact is effected will vary depending upon the classes of the starting materials used.

For instance, in mixing silica, phosphoric acid and an ammoniacal nitrogen compound, the components are suitably reacted usually at a temperature above 80°C. under conditions which are adequate to volatilize the moisture. On the other hand, in mixing silica or ammonia-adsorbed silica with ammonium phosphate, though mixing in the solid phase is possible, the mixing is preferably carried out at the hereinabove indicated temperature using a small amount of water as the medium. Further, in reacting silicon phosphate with an ammoniacal nitrogen compound, the reaction can be carried out by directly passing ammonia gas through the solid silicon phosphate, or the solid silicon phosphate can be mixed with an aqueous solution of the ammoniacal nitrogen compound, after which the mixture is dried to obtain the intended product.

Further, the adsorption of ammonia to the resulting solid powder can be carried out, as required, to obtain the intended product containing the phosphoric, silicic and ammoniacal components in the ranges desired.

The titanium phosphate to be used as a rust preventing pigment is prepared in this invention by methods which per se are known, except for the provision to ensure the content of the water-soluble component and the acidity are within the hereinbefore specified range. For example, it can be prepared by the methods described in British Pat. No. 1,161,141 and U.S. Pat. No. 3,471,252. For instance, titanium phosphate can be readily prepared usually by reacting either an inorganic or organic acid solution of a titanium compound, a titanium salt per se, or an amorphoustitanium oxide with an oxyacid of phosphorus or a phosphorus oxyacid derivative that can liberate a phosphorus oxyacid component under the reaction conditions and thereafter calcining the resulting phosphorus oxyacid salt of titanium, as desired.

In preparing the titanium phosphate for use in this invention, first, either an inorganic or organic acid solution of a titanium compound, a titanium salt per se or an amorphous titanium oxide is reacted in the presence of water with either a phosphorus oxyacid or a phosphorus oxyacid derivative that can form a phosphorus oxyacid radical under the reaction conditions to form a titanium phosphate gel whose composition is in the range hereinbefore indicated. Next, this titanium phosphate gel is either dried or calcined in such a manner that the water-soluble component is contained in the resulting product in an amount of at least 0.1 percent, and preferably 0.6 to 20 percent, and the pH of a 10 percent aqueous suspension of the resulting product is not more than 3.5, and preferably from 1 to 2.5. While the drying and calcining conditions will vary considerably depending upon the composition of the titanium phosphate, it can be experimentally chosen from a temperature of 100°–1,000°C., and preferably 250°–800°C., and a time of 30 minutes to 3 hours such as to satisfy the hereinbefore indicated requirements.

Zirconium phosphate, which is used in the invention as a flame resistant and corrosion resistant white pigment, can be prepared in the following manner. The starting zirconium material used is either (1) an acid solution thereof obtained by melting a concentrate of zirconium minerals such as zircon sand ($ZrO_2 \cdot SiO_2$) and baddeleyite ($ZrO_2$) with an alkali, as required, to vitrify the zirconium mineral and thereafter dissolving same in a mineral acid such as sulfuric, hydrochloric or nitric acid; (2) zirconium chloride obtained in an intermediate stage of the so-called Kroll method, a method which comprises heating a zirconium mineral in the presence of a carbon such as coke, followed by passing chlorine therethrough; (3) zirconium hydroxide obtained by hydrolysis in customary manner of an acid extract of a zirconium mineral. These starting zirconium materials are reacted with either a phosphorus oxyacid or a reactive derivative thereof, after which the resulting zirconium phosphate is calcined. The starting zirconium and the phosphorus oxyacid or the reactive derivative thereof are made to satisfy the conditions of the hereinbefore given formula (I-3). In calcining the zirconium phosphate, suitable conditions are chosen from the conditions of temperature in the range of 100°–900°C. and a time from 30 minutes to 3 hours so as to ensure that the water-soluble component becomes at least 0.1 percent.

Thus, a new pigment of a composition represented by the foregoing generic formula (I) is obtained in accordance with the present invention. Needless to say, the resulting pigment can, if desired, be acid-washed and/or water-washed or comminuted by either the dry or wet method and made into a product having the form of either a slurry, paste or powder. Again, the dispersibility of the white pigment can be improved by forming a coating of metal oxides or organic substance on its surface in customary manner.

According to the invention, the pigment is preferably comminuted so as to satisfy the conditions of the hereinbefore given formula (II) while preventing the particles from aggregating. In order to achieve this end, the pigments obtained by the foregoing processes should be comminuted in an organic solvent which does not dissolve the water-soluble component of the aforesaid phosphates: e.g., alcohols such as methanol and ethanol; ethers such as diethyl ether and tetrahydrofuran; ketones such as acetone and methyl ethyl ketone; hydrocarbon solvents such as n-hexane, kerosene, benzene, toluene and xylene; and halogenated hydrocarbon solvents such as chloroform, methylene chloride and tetrachloroethylene; using a grinder such as ball mill or tube mill. Now, if a low boiling solvent is used in this case, the pigment can be recovered in a finely divided form without aggregation of the pigment particles. Again, if a resin such as rosin, alkyd resin and petroleum resins, or a higher fatty acid such as stearic acid, or a metallic soap such as calcium or barium stearate is dissolved in advance in the foregoing solvents and the comminution of the pigment is carried out in such a solvent, followed by evaporation of the solvent, the surface of the pigment particles can be coated with these substances. Further, the pigment which has been comminuted in the foregoing solvents can be put to its intended final use in its as-obtained state (in a slurry or a caked state). Alternatively, the pigment can be comminuted in a hereinafter mentioned paint vehicle and put to its final intended use in this state. Further, in order to acelerate the drying of the coated film by preventing the interaction with the hardener contained in the vehicle, it is effective to coat the particles of the titanium phosphate or silicon phosphate with 0.5–5 percent by weight, based on the titanium or silicon phosphate, of an oxide of an alkaline earth metal, such as magnesium or calcium oxide, aluminum oxide or silica gel.

USES

The phosphatic white pigment of the present invention was found to not only excel in its reflectance in the ultraviolet and near ultraviolet regions but also possesses new properties, i.e., excellent flame resistant and rust preventing properties, not seen in the conventional white pigments.

That is, when the phosphatic white pigment is incorporated in a resin or dispersed a vehicle and applied to a substrate, a marked flame resistance can be imparted to the resinous shaped article, coating or the substrate. For example, even though known white pigment such as titanium dioxide is dispersed in a vehicle and this is applied to paper, the self-burnability of the paper cannot be prevented, but when a coating containing the white pigment of the present invention is applied to paper, the self-burnability of the paper can be substantially prevented.

Thus, the white pigment is valuable as a pigment for paints, a pigment for use in paper making, a delustrant for textiles and a pigment for use with various molding resins. In addition, it can be incorporated in the known pigments to improve their whiteness, or it can be used as a white pigment for imparting fire resistant or flame retardent properties as well as corrosion resistance to various classes of shaped articles.

The phosphatic pigments of the invention can be blended in a paint vehicle or a molding resin, for example, in an amount of 1 to 300 parts by weight, and preferably 5 to 100 parts by weight, per 100 parts by weight of the vehicular base or resin.

In one embodiment of the invention there a rust preventing paint for metallic surface is provided composed of (a) a vehicle containing a coating film-forming base preferably selected from the group consisting of alkyd resins, epoxy resins, air-drying oils, phenolic resins, polyvinyl acetals, vinyl chloride resins and polyvinyl acetate, and (b) a rust preventing pigment, wherein the aforesaid rust preventing pigment consists of a phosphate having the composition represented by the formula $$M^1O_2 \cdot xY \cdot \left(0.1\sim1.5 + \frac{mx}{2}\right) P_2O_5$$

wherein
  $M^1$ is silicon, titanium or zirconium,
  Y is a nitrogen-containing base or an oxide of the formula $$M^2O_{n/2}$$

where $M^2$ is an alkali metal, alkaline earth metal, aluminum, lead or zinc and $n$ is the valence of the metal $M^2$,
  $x$ is a positive number up to 6, including 0, and
  $m$ is 1 when Y is a nitrogen-containing base and is $n$ when Y is $$M^2O_{n/2} ;$$

such phosphate containing at least 0.1 percent of a water-soluble component, and moreover such phosphate being present in an amount of 1–300 parts by weight per 100 parts by weight of the coating film-forming base.

The foregoing rust preventing paint of the invention can be readily applied as an undercoat to a metallic substrate by the user and excellent adhesion is demonstrated between this paint and the metallic substrate as well as the final coat. In addition, the rust preventing effect can be maintained over a prolonged period of time.

As the coating film-forming base of the vehicle for the rust preventing paint, the alkyd resins, epoxy resins, air-drying oils, phenolic resins, polyvinyl acetals, vinyl chloride resins and polyvinyl acetate are usable, which may be used singly or as combinations of two or more classes thereof. These coating film-forming bases are used in the form of either or organic solvent solution or an aqueous emulsion.

As the alkyd resins, usable are either the condensation products of a polybasic acid such as phthalic anhydride, terephthalic acid, succinic acid, adipic acid, selbacic acid, fumaric acid, itaconic acid and cyclopentadiene-maleic anhydride adduct with a polyhydric alcohol such as ethylene glycol, propylene glycol, glycerine, trimethylolpropane, pentaerythritol, mannitol and sorbitol; or a modified alkyd resin obatined by the condensation of the foregoing polybasic acids and polyhydric alcohols with such oils or fats and higher fatty acids as soybeen oil, linseed oil, tung oil, coconut oil, stearic acid, oleic acid, linolic acid and linolenic acid and such modifier as natural resins, such as rosin, copal and shellac and synthetic resins as phenolic resins, urea resins and melamine resins.

These alkyd resins can be used in solution form dissolved in an aromatic hydrocarbon such as toluene or xylene, or they can be used in form of an aqueous emulsion by emulsification with a known emulsifier such as the non-ionic surfactants, the cationic surfactants, or the siloxaneoxyalkylene copolymer. Needless to say, the vehicle can be incorporated with a dryer such as cobalt naphthenate or manganese naphthenate in accordance with the recipes which are known per se.

As the epoxy resins, the bisepoxy compounds consisting of a condensation product of epichlorohydrin and a polyhydric phenol, e.g., bisphenol or resol, and the combinations with a hardener such as phenolic resins, urea resins, polyamide resins and organic acids can be used. Alternately, a reaction product of the aforesaid bisepoxy compounds with oils and fats or fatty acids can also be used. These epoxy resins are diluted with a mineral oil and used as the vehicle.

As the drying oils, linseed oil, perilla oil, tung oil, boiled linseed oil, maleic oil styrenated oil and epoxidized oil are used along with such dryers as cobalt naphthenate and manganese naphthenate.

As the phenolic resins, usable, in addition to the usual resol type phenolic resin varnish, are those consisting of a phenolic resin modified by a fatty acid or a resin acid followed by the addition of a drying oil and heat treatment or those phenolic resins consisting of a condensation product of an alkyl phenol, e.g. p-tert. butylphenol, and formaldehyde followed by the addition of a drying oil and heat treatment. These phenolic resins are used diluted with a ketone or an aromatic hydrocarbon.

As polyvinyl acetals, polyvinyl butyral and the copolymers having a vinyl alcohol unit and a vinyl butyral unit can be used.

Conveniently usable as the vinyl chloride resins are the copolymers of vinyl chloride with a small amount of vinyl acetate, and the ternary copolymer of vinyl chloride, a small amount of vinyl acetate and a small amount of vinyl alcohol or maleic acid. These are used in the form of a solution in a ketone and/or an aromatic hydrocarbon solvent along with a small amount of a plasticizer. Alternately, the vinyl chloride resin can also be emulsified and dispersed by means of a surfactant and used in the form of an aqueous emulsion.

As the polyvinyl acetate, polyvinyl acetate or an aqueous emulsion of a vinyl acetate resin containing a small amount of vinyl alcohol units, or a small amount of vinyl alcohol and vinyl butyral units are usable.

The foregoing rust preventing paint vehicles are all known in the art. To these paint vehicles such plasticizers as dibutyl phthalate, tricresyl phosphate, dioctyl phthalate and n-hydroxymethylphthalamide, such dryers as cobalt naphthenate, manganese naphthenate, cobalt linolate, lead naphthenate and zirconium naphthenate, such hardeners as benzoyl peroxide and methyl ethyl ketone peroxide, such dispersants as aluminum stearate, lecithin and polyethylene glycol alkyl ether, such emulsion stabilizers as polyvinyl alcohol and methyl cellulose, such emulsifiers as triethanolamine and surfactants, such thickeners or extenders as kaolin, magnesium silicate, calcium silicate and silica gel, or other rust preventing pigments can be added, as required.

While the rust preventing paint of the present invention is especially effective in preventing the rusting of an iron substrate, it also is effective in preventing the rusting of the various other metals such as copper, nickel, chromic acid-treated iron, galvanized iron and magnesium alloys. In applying the invention rust preventing paint to an iron substrate, various methods of applying the paint can be employed depending up on the amount of pigment contained in the paint. For instance, in the case where the content of the pigment is great, application by means of such as brush, spatula and roller can be employed, whereas in the case where the content of the pigment is small, application by means of spraying or dipping or by electrostatic or electrophoretic technique can be employed. In any of the foregoing instances, the use of water, thinner or other diluents can be made for reducing the viscosity of the paint. The invention rust preventing paint can be applied directly to the surface of an iron substrate, or it can be applied to the surface of an iron substrate which has undergone a phosphoric acid treatment.

The rust preventing paint containing as its pigment the silicon phosphate or titanium phosphate according to the invention not only demonstrates a rust preventing property superior to that of the conventional rust preventing paints but also shows no tendency at all of degrading the vehicle. In addition, the invention rust preventing paint, when applied as an undercoat to a metallic substrate, adheres exceedingly well to the surface of the metal and maintains its rust preventing effect for a prolonged period of time even when exposed to corrosive conditions for a long period of time.

Further, the rust preventing paint of the present invention is white in color and has no tendency whatsoever of coloring the metallic substrate with a specific color. Therefore, its feature is that a true rendition of the color of the final coating is made possible even when the coating film of the final coating is relatively thin. Again, the rust preventing paint is also superior in the point that it is not toxic, since it does not contain lead.

Thus, the invention rust preventing paint can be used for various purposes as a white rust preventing paint, supplanting the various conventional rust preventing paints, zinc chromate primer and primer and wash primer.

By way of example, a number of recipe are shown below.

Recipe 1
White linseed oil rust preventing paint.

| | Parts |
|---|---|
| Titanium phosphate of Example 2 | 220 |
| Rutile type titanium dioxide | 110 |
| Magnesium silicate | 250 |
| Raw linseed oil | 210 |
| Heavy-bodied linseed oil | 110 |
| 6% Cobalt naphenate | 2 |
| 6% Manganese maphthanate | 10 |
| Mineral spirit | 88 |

Recipe 2
Alkyd-based white rust preventing paint.

| | Parts |
|---|---|
| Titanium phosphate of Example 2 | 100 |
| Silicon phosphate of Example 1 | 60 |
| Rutile type titanium dioxide | 100 |
| Calcium corbonate | 210 |
| Soybean oil-modified alkyd resin (50% mineral spirit solution, acid value 10) | 280 |
| Linseed oil | 3 |
| 24% Lead naphthenate | 1 |
| 6% Cobalt naphthenate | 1 |
| Mineral sprit | 245 |

Recipe 3
Phenolic resin primer.

| | Parts |
|---|---|
| Silicon phosphate of Example 1 | 14 |
| Rutile type titanium dioxide | 10 |
| Calcium silicate | 20 |
| Dehydrated castor oil-phenolic ether ester resin | 18 |
| Xylene | 20 |
| Mineral sprit | 18 |

Recipe 4
Epoxy-based rust preventing and flameproofing paint.

| | Parts |
|---|---|
| Titanium phosphate of Example 2 | 100 |
| Silicon phosphate of Example 1 | 50 |
| Rutile type titanium dioxide | 100 |
| Dehydrated castor oil-modified alkyd resin (50% mineral solution) | 400 |
| Aluminum stearate | 100 |
| Soybean lecithin | 5 |
| 6% Cobalt naphthenate | 2 |
| 6% Zirconium catalyst | 10 |
| Xylene | 120 |
| Naphtha | 113 |

Recipe 5
Vinyl chloride resin primer.

| | Parts |
|---|---|
| Titanium phosphate of Example 2 | 22 |
| Vinyl chloride resin* | 5 |
| Tricresyl phosphate | 3 |
| Methyl ethyl ketone-toluene (1:1) | 60 |
| *Ternary copolymer of 91% vinyl chloride, 3% vinyl acetate and 6% vinyl alcohol. 20°C. | |
| [η]Cyclohexan | 0.57 |

Recipe 6
White polyvinyl acetate rust preventing and flamproofing pigment.

| | Parts |
|---|---|
| Titanium phosphate of Example 2 | 130 |
| Silicon phosphate of Example 1 | 40 |
| Rutile type titanium dioxide | 140 |
| Polyvinyl acetate emulsion (55% solids) | 270 |
| Dibutyl phthalate | 20 |
| Propylene glycol | 45 |
| Methocel (2% aqueous solution) | 200 |
| Water | 155 |

Recipe 7
Flameproofing and rust preventing oil paint

| | Parts |
|---|---|
| Boiled linseed oil | 100 |
| Polyamide resin (50% solution) | 50 |
| Titanium dioxide | 50 |
| Titanium phosphate of Example 2 | 50 |
| Ammonium phosphate silicate of Example 9 | 30 |
| Zinc borate | 30 |
| Melamine resin | 20 |
| Starch | 5 |
| Chlorinated paraffin | 10 |

Recipe 8
Emulsion type flameproofing paint.

| | Parts |
|---|---|
| Water | 100 |
| Polyvinyl acetate emulsion (55% solids) | 50 |
| Rutile type titanium dioxide | 50 |
| Dibutyl phthalate | 5 |
| Ammonium phosphate silicate of Example 9 | 20 |
| Dicyandiamide | 20 |
| pentaerythritol | 50 |
| Chlorinated paraffin | 5 |

Recipe 9
Unsaturated polyester molding commposition.

| | Parts |
|---|---|
| Unsaturated polyester resin | 100 |
| Peroxide | 0.2 – 3 |
| Naphthenate | 0.2 – 2 |
| ammonium phosphate silicate of Example 9 | 5 – 80 |
| Chlorinated paraffin | 5 – 20 |
| Pigment | 0 – 50 |

Recipe 10
Poluvinylbutyral mesh primer.

| | Parts |
|---|---|
| Silicon phosphate of Example 1 | 10 |
| Polyvinyl butyral | 8 |
| Finely divided silica | 2 |
| Isopropanol (99%) | 60 |
| Butanol | 16 |
| Water | 4 |

The following examples are given for specifically illustrating the invention.

EXAMPLE I

A white pigment consisting of silicon phosphate is prepared, using a xerogel of silica and orthophosphoric acid. The procedure of preparation and the properties of the so obtained white pigment are described below.

The silicon phosphate is prepared in the following manner. A commercially available sodium silicate solution is neutralized with sulfuric acid to gel the silicic acid, after which the gel is thoroughly washed to prepare small purified aggregates of hydrogel of silica followed by drying the same. The so obtained xerogel of silica is then impregnated with a phosphoric component by adding commercial reagent orthophosphoric acid (JIS first grade 85 percent $H_3PO_4$, sp. gr. 1,690). In this case the composition of the silicic component and the phosphoric component is so adjusted that the molar ratio of $SiO_2:P_2O_5$ is 1:0.5 After drying this impregnated product, it is calcined for 2 hours at 800°C. in an electric furnace, followed by wet-comminution for 3 hours in a pot mill filled with balls, using methyl alcohol as the grinding medium. After the methyl alcohol, the grinding medium, is separated and recovered, the product is dried. As a result, a finely divided, white silicon phosphate pigment is obtained.

The identification by means of the X-ray diffraction analysis of the so obtained finely divided, white silicon phosphate pigment and measurement of its properties such as its whiteness, especially its reflectance in the ultraviolet region, its water-soluble component, pH of its 10 percent aqueous suspension, particle size and rate of secondary aggregation are made. The results obtained are shown in Table 4.

The degree of whiteness is measured in the following manner. Measurements are made in accordance with the powder technique using a spectrophotometer. An alumina sheet is used as the standard white sheet, and the reflectance at the several wavelengths in percent on the basis of the alumina sheet as 100 indicates the degree of whiteness.

The content of the water-soluble component is determined in the following manner. Twenty grams of the powder pigment are placed in a 100-ml graduated flask. Next, after adding about 70 ml of water, boiling for 5 minutes and cooling, water is added up to the calibration mark. The contents are then shaken well and thereafter allowed to stand for 1 hour. This is followed by filtering the contents of the flask with a dry filter paper. The initial 20 ml of filtrate are discarded, after which the next 50 ml of clear liquid are collected in a weighing bottle for evaporative drying use and evaporated to dryness. Next, after drying the residue for 1 hour at 105°–110°C, it is weighed. The amount in weight percent of the water-soluble component contained in the sample is then calculated from the weight of the residue obtained after evaporation of the liquid.

The pH of the 10 percent aqueous suspension is determined in the following manner. A well shaken and dispersed aqueous suspension of 10 percent concentration at room temperature (23° ± 2°C.) is prepared. After allowing this suspension to stand for 1 hour, its pH is measured with a pH meter.

The particle size is determined by measurements of the size of the pigment particles by examining under a microscope.

The rate of aggregation (Q) is determined in the following manner. Powder pigment dried at 90°–110°C. is first passed through a 100-mesh (74 micron) sieve, after which the powder is allowed to stand for 24 hours in a desiccator adjusted to a relative humidity of 90 percent with a sulfuric acid solution, thereby causing the full adsorption of moisture by the powder. The sample powder is then sieved while being shaken for 10 minutes on a 100-mesh screen using a sieve shaker (manufactured by Maruto-Seisakujo, Japan). The sample which remains on the sieve at this time is indicated in percent and this value is designated the rate of aggregation (percent). Next, as the rustproofness test, the general testing method for paints as provided in JIS K5400 is followed and evaluations of the rustproofing effects are made by means of the weathering test and saltwater spray test techniques of film coatings applied to a soft steel plate. In carrying out this rustproofness test, tests are also carried out on the commercially available rust preventing pigments such as red lead, lead cyanamide, zinc chromate, zinc white and calcium phosphate and comparative evaluations are made with the case of the use of the silicon phosphate in accordance with the present invention. The results obtained are shown together in Table 4.

In preparing the paints with these pigments, 10 parts by weight of the several pigments are blended with 100 parts by weight of a commercially available alkyd resin vehicle (Beckosol P-470, manufactured by Dainippon Ink & Chemical Company) and mixed and dispersed in the vehicle in a ball mill. The so obtained paints are used and rustproofness test is carried out in the following manner.

As the soft steel test plate specified by JIS K5400, a cold-rolled steel plate (JIS G3141 Specification B) is used. This plate whose whole surface is polished thoroughly and evenly with a No. 280 waterproof sandpaper until it exhibits a metallic luster qualifies for use in the foregoing test.

The so prepared steel plate is used and a coating is applied by the procedure specified by JIS K5400 to a film thickness of 40–50 microns by the spraying technique, followed by natural drying at room temperature and normal humidity.

The weathering test is carried out in accordance with the conditions stipulated in JIS K5400 in the following manner. The coated surface of the test plate is exposed to air outdoors. After the passage of a period of 2 years, the coated surface of the several plates are comparatively observed and the conditions of rust appearing on the coated surface are compared and evaluated. The method of evaluation adopted is to classify the conditions of the rusting of plate surface into five classes and awarding the ratings A, B, C, D and E as follows:

A: No rust noted, there being practically no change since the time the test plate was painted.
B: Rusts on the order of pinholes are noted.
C: Rusting of part of the test plate, and cracks and bulges of parts of the film coating noted.
D: A major part of the test plate is rusted, and a major part of the film coating has peeled off.
E: Rupture of the film coating and rusting over the whole of the substrate has occurred.

The salt water spray test is conducted in accordance with the conditions stipulated in JIS K5400 in the following manner. The coated surface of the test plate is exposed to spray of saltwater of 60°C. in a saltwater spraying chamber for a period of 300 hours. The coated surface of the so exposed test plates is then comparatively observed and from the conditions of rust noted are evaluated and rated into the five classes A, B, C, D, and E as in the case with the foregoing weathering test.

The results of the foregoing tests for determining the rustproofness of the pigments are shown in Table 4.

Next, the flameproofness test is carried out in the following manner. After making the pigment into a paint with a sizing agent, a test sheet is prepared by coating a sheet of paper with this paint. The fireproofness effect is then determined by an evaluation of what happens when a flame is directed against the test sheet. This test is also carried out on the conventional commercially available white pigments such as the rutile type titanium dioxide, white carbons and ammonium phosphate, and the flameproofness of these pigments is evaluated and compared with that of the silicon phosphate obtained in the present example.

In preparing these pigments into paints, the commercially available latex (Dow Chemical product 402) is used as the sizing agent, and 3 parts by weight thereof along with 10 parts by weight of commercially available melamine resin powder (a commercial reagent of Wako Junyaku Co., Japan) and 10 parts of water are blended with 10 parts by weight of the several pigments and rendered into a homogeneous paste by thorough mixing. Each of the so obtained flameproof paints is applied to both sides of drawing paper to a thickness of 1–0.8 mm and dried. Small pieces of the so prepared sheets are used as the test piece.

The flameproofness of the test piece is first tested by directing a flame against it and determining whether there is a propagation of the flame. If propagation of the flame takes place, the test piece is deemed to possess no flameproofness and is eliminated from further testing. Next, the test piece which has qualified as being flameproof is submitted to the test to be given to paper which has received a fireproof treatment, i.e. a test in accordance with the ASTM D777–46 method. The length in millimeters of the carbonization that takes place when the test piece is applied a flame for 12 seconds is measured, and the excellence of the flameproofness is judged on the basis of the length of the carbonization, the shorter the carbonization, the better the flameproofness.

The results of the foregoing flameproofness tests are also shown in Table 4.

Table 4

| Identification by means of X-ray diffraction analysis | | $Si_2P_2O_9$ |
|---|---|---|
| Degree of whiteness (% reflectance): | | |
| Wavelengths (m$\mu$) | | |
| 350 | | 67.6 |
| 400 | | 91.2 |
| 500 | | 94.5 |
| Water-soluble component (wt %) | | 26.9 |
| pH of 10% aqueous suspension | | 2.8 |
| Particle size ($\mu$) | | below 5 |
| Rate of aggregations (Q) (%) | | 5 |
| Rustproofness test | | |
| | Weathering Test | Saltwater spray Test |
| Pigment of present example | A | A |
| Red lead ($Pb_3O_4$) | B | B |
| Lead cyanamide ($PbCN_2$) | B | B |
| Zinc chromate ($K_2O.4ZnO.4CrO_3.3H_2O$) | B | B |
| Zinc white (ZnO) | C | D |
| Calcium phosphate [$Ca_3(PO_4)_2$] | E | E |
| Flameproofness test (mm/12 sec.) | | |
| Pigment of present example | 8 | |
| Rutile type titanium dioxide ($TiO_2$) | no flameproofness | |
| White carbon ($SiO_2$) | do. | |
| ammonium phosphate [$(NH_3)_2HPO_4$] | 20 | |

It can thus be seen from the foregoing results that the silicon phosphate pigment prepared in the present example is a white pigment which demonstrates satisfactory results with regard to rustproofness and flameproofness.

EXAMPLE II

A white pigment consisting of titanium phosphate is prepared from titanium tetrachloride and orthophosphoric acid. The procedure involved in the preparation of this white pigment and its properties are described below.

The titanium phosphate is prepared in the following manner. A solution of commercial reagent grade titanium tetrachloride and commercial reagent grade orthophosphoric acid are charged to a high speed agitating mixer and mildly reacted to form a white titanium phosphate gel. After ageing this gel at a temperature of 60°–70°C., it is thoroughly washed first in aqueous hydrochloric acid and then in water. The preparation of the pigment is so carried out that the composition of the titanium and phosphoric components is so adjusted that the molar ratio of $TiO_2:P_2O_5$ is 1:1 at this time. After this washed titanium phosphate gel has dried, it is calcined for 1 hour at 400°C. in an electric furnace, followed by wet-comminution for 3 hours in a pot mill filled with balls, using methyl alcohol as the grinding medium. After separating and recovering the methyl alcohol, the grinding medium, the product is dried to obtain a finely divided, white titanium phosphate pigment.

The identification of the so obtained finely divided, white titanium phosphate pigment by means of X-ray diffraction analysis and measurement of its properties such as its degree of whiteness, and especially its reflectance in the ultraviolet region, its content of the water-soluble component, the pH of its 10 percent aqueous suspension, size of its particles and its rate of aggregation is made. Again, a rustproofness as well as a flameproofness test is conducted as in Example I and evaluations are made. The results obtained are shown in Table 5.

Table 5

| Identification by means of X-ray diffraction analysis | predominantly noncrystalline $TiP_2O_7$ |
|---|---|
| Degree of whiteness (% reflectance) | |
| Wavelengths (m$\mu$) | |
| 350 | 60.0 |
| 400 | 105.0 |
| 500 | 105.0 |
| Water-soluble component (wt %) | 2.55 |
| pH of 10% aqueous suspension | 1.2 |
| Particle size ($\mu$) | below 2 |
| Rate of aggregation (Q) (%) | 5 |
| Rustproofness test | |
| Weathering method | A |
| Saltwater spray method | A |
| Flameproofness test (mm/6 sec.) | 10 |

It can thus be seen that the titanium phosphate pigment prepared in this example is a white pigment which demonstrates satisfactory results with regard to rustproofness and flameproofness.

EXAMPLE III

A white pigment consisting of zirconium phosphate is prepared from zirconium nitrate and orthophosphoric acid. The procedure of preparation and properties are described below.

The zirconium phosphate is prepared by charging a commercial reagent grade zirconium nitrate solution and commerical reagent grade orthophosphoric acid to a high speed agitating mixer where the components are mixed and reacted to form a white zirconium phosphate gel, followed by thorough washing, first in aqueous hydrochloric acid and then in water. The composition of the zirconium and phosphoric components are so adjusted at this time that the molar ratio of $ZrO_2:P_2O_5$ is 1:1. After drying the washed zirconium phosphate gel, it is calcined for 1 hour at 200°C. in an electric furnace, following which the wet-comminution of the product is carried out as in Example I, using methyl alcohol. This is followed by drying the comminuted product to obtain a finely divided, while zirconium phosphate pigment.

The identification of the so obtained finely divided, white zirconium phosphate pigment is carried out by means of X-ray diffraction analysis and measurement of its properties such as degree of whiteness, content of the water-soluble component, pH of its 10 percent aqueous suspension, particle size and rate of aggregation is made. Again, the rustproofness and flameproofness tests are conducted as in Example 1 and its rustproofness and flameproofness are evaluated. The foregoing results are shown in Table 6.

Table 6

| Identification by means of X-ray diffraction analysis | $ZrP_2O_7$ |
|---|---|
| Degree of whiteness (% reflectance) | |
| Wavelengths (mμ) | |
| 350 | 117 |
| 400 | 115 |
| 500 | 115 |
| Water-soluble component (wt %) | 11.5 |
| pH of 10% aqueous suspension | 2.45 |
| Particle size (μ) | below 5 |
| Rate of aggregation (Q) (%) | 1 |
| Rustproofness test | |
| Weathering method | A |
| Saltwater spray method | A |
| Flameproofness test | 12 |

It can thus be seen from the foregoing results that the zirconium phosphate pigment prepared in this example is a white pigment which demonstrates satisfactory results with regard to rustproofness and flameproofness.

EXAMPLE IV

This example will illustrate the case where the various silicon phosphate, titanium phosphate and zirconium phosphate pigments have been used as the rust preventing pigment.

Fifteen classes of finely divided, white silicon phosphate pigments are prepared in accordance with the procedure described in Example I in the following manner. Silicon phosphates prepared from a xerogel of silica and orthophosphoric acid such that the molar ratios of $SiO_2:P_2O_5$ (indicated by the number of $n$ in $SiO_2.nP_2O_5$) are as shown in Table 7 are thereafter treated at the respective temperatures and times as indicated in Table 7. The so obtained products are wet-comminuted, as in Example I, using methyl alcohol and thereafter dried to obtain the intended pigments.

Fourteen classes of finely divided, white titanium phosphate pigments are prepared in accordance with the procedure described in Example II in the following manner. Titanium phosphates prepared from titanium tetrachloride and orthophosphoric acid such that the molar ratios of $TiO_2:P_2O_5$ (indicated by the number $n$ of $TiO_2.nP_2O_5$) are as shown in Table 7 are thereafter treated at the respective temperatures and times as indicated in Table 7. The so obtained products are then comminuted, as in Example I, using methyl alcohol and thereafter dried to obtain the intended pigments.

Six classes of finely divided, white zirconium phosphate pigments are prepared in accordance with the procedure described in Example III in the following manner. Zirconium phosphates prepared from zirconium nitrate and orthophosphoric acid such that the molar ratios of $ZrO_2.nP_2O_5$ (indicated by the number $n$ of $ZrO_2.nP_2O_5$) are as shown in Table 7 are thereafter treated at the respective temperatures and times indicated in Table 7. The so obtained product is then wet-comminuted, as in Example I, using methyl alcohol and thereafter dried to obtain the intended pigments.

The properties such as the pH of the aqueous suspension, the content of the water-soluble component and the rate of aggregation of the foregoing 35 classes of finely divided, white pigments are measured. The results obtained are shown in Table 7. Again, the rustproofness effect is evaluated as in Example I by means of the weathering and salt water spray tests and the ratings awarded are also shown in Table 7.

It can be appreciated from the following results that satisfactory results with regard to rustproofness are demonstrated in those cases where the content of the water-soluble component is at least 0.1 percent, and preferably at leat 0.6 percent, and moreover where the pH of the aqueous suspension is not greater than 3.5.

Table 7

| | Phosphate Preparation Conditions | | | | Properties of Phosphatic Pigment | | | Rustproofness Rating | |
|---|---|---|---|---|---|---|---|---|---|
| Sample No. | Silicon, Titanium or Zirconium | Molar Ratio (n) $MO_2.nP_2O_5$ | Treatment Temperature (°C) | Treatment Time (hrs) | pH of Aqueous Suspension | Water-soluble Component (wt %) | Aggregation (%) | Weathering Test | Saltwater Spray Test |
| 1 | Silicon | 0.1 | 150 | 2 | 3.5 | 0.28 | 2 | B | C |
| 2 | do. | 0.2 | 150 | 2 | 2.8 | 1.17 | 2 | B | B |
| 3 | do. | 0.2 | 500 | 2 | 3.0 | 0.56 | 1 | B | C |
| 4 | do. | 0.3 | 300 | 2 | 2.8 | 1.57 | 1 | A | B |
| 5 | do. | 0.3 | 600 | 2 | 2.9 | 1.03 | 1 | B | B |
| 6 | do. | 0.5 | 300 | 2 | 2.6 | 4.69 | 2 | A | A |
| 7 | do. | 0.5 | 500 | 2 | 2.7 | 3.00 | 2 | A | A |
| 8 | do. | 0.5 | 800 | 2 | 2.8 | 2.64 | 2 | A | A |
| 9 | do. | 0.7 | 500 | 2 | 2.6 | 5.73 | 5 | A | A |
| 10 | do. | 0.7 | 700 | 2 | 2.7 | 4.22 | 5 | A | A |
| 11 | do. | 0.7 | 900 | 2 | 2.8 | 3.17 | 5 | A | A |
| 12 | do. | 1.0 | 400 | 2 | 1.8 | 9.75 | 5 | A | A |
| 13 | do. | 1.0 | 1000 | 2 | 2.7 | 5.75 | 5 | A | A |
| 14 | do. | 1.5 | 400 | 2 | 1.7 | 9.87 | 10 | A | A |
| 15 | do. | 1.5 | 1000 | 2 | 2.5 | 5.98 | 5 | A | A |
| 16 | Titanium | 0.2 | 250 | 1 | 2.8 | 0.15 | 1 | B | C |
| 17 | do. | 0.3 | 110 | 3 | 2.4 | 0.20 | 1 | B | B |
| 18 | do. | 0.3 | 250 | 2 | 2.6 | 0.14 | 1 | B | B |
| 19 | do. | 0.3 | 500 | 2 | 2.9 | 0.12 | 1 | B | C |
| 20 | do. | 0.5 | 250 | 2 | 2.2 | 0.69 | 2 | A | A |
| 21 | do. | 0.5 | 500 | 2 | 2.5 | 0.52 | 2 | B | B |
| 22 | do. | 0.7 | 250 | 2 | 1.6 | 1.23 | 2 | A | A |
| 23 | do. | 0.7 | 500 | 2 | 1.9 | 0.89 | 2 | A | A |
| 24 | do. | 0.7 | 800 | 2 | 2.7 | 0.25 | 1 | B | B |
| 25 | do. | 1.0 | 400 | 3 | 1.2 | 2.55 | 5 | A | A |
| 26 | do. | 1.0 | 600 | 3 | 1.9 | 0.75 | 5 | A | A |
| 27 | do. | 1.0 | 850 | 3 | 3.7 | 0.07 | 3 | C | C |
| 28 | do. | 2.0 | 500 | 2 | 0.7 | 12.20 | 5 | A | A |
| 29 | do. | 2.0 | 800 | 2 | 1.9 | 2.04 | 3 | A | A |
| 30 | Zirconium | 0.5 | 150 | 1 | 2.3 | 33.8 | 2 | A | A |
| 31 | do. | 0.5 | 300 | 1 | 2.5 | 15.5 | 1 | B | B |
| 32 | do. | 0.5 | 900 | 1 | 3.7 | 0.8 | 1 | B | C |
| 33 | do. | 1.0 | 150 | 1 | 2.3 | 14.2 | 2 | A | A |
| 34 | do. | 1.0 | 400 | 1 | 2.9 | 6.7 | 1 | B | B |
| 35 | do. | 1.0 | 700 | 1 | 3.8 | 0.1 | 1 | B | C |

EXAMPLE V

This example describes the case where the various silicon phosphate, titanium phosphate and zirconium phosphate pigments are used as flameproof pigments.

As the various phosphatic pigments, 10 classes of the finely divided, white phosphatic pigments indicated by the Sample Nos. 4, 8, 12, 14, 17, 21, 23, 25, 30 and 33 as shown in Table 7 are used and the flameproofness test in accordance with the method described in Example I is carried out. The ratings obtained are shown in Table 8.

It can be seen from the following results that a staisfactory flameproofness effect is demonstrated by the finely divided, white phosphate pigments obtained in this example.

acid sol containing impurities, from which the impurities are removed after gelling the silicic acid, and (d) a commercially available powdered, silica gel product for reagent use. To each of the so prepared silica materials commercial orthophosphoric acid (JIS first grade 85.0 percent $H_3PO_4$, sp. gr. 1.69) is added such that the molar ratio of $SiO_2:P_2O_5$ becomes 1:0.5, the two components then being blended in a mortar to effect their thorough and intimate contact.

After drying the several blends, they are calcined for 2 hours at 800°C. and thereafter wet-comminuted as in Example I using methyl alcohol, followed by drying to obtain the several finely divided, white pigments.

The properties of the so obtained several finely divided white pigments such as their degree of whiteness, Table 9

| Starting Silica Gel | Degree of Whiteness (Reflectance %) (Wavelength mµ) | | | | | Water-Soluble Component (%) | pH of 10% Aq. Suspension | Particle Size | Aggregation (%) | Rust-proofness Test | Flame-proofness Test |
|---|---|---|---|---|---|---|---|---|---|---|---|
| | 350 | 400 | 450 | 500 | 550 | | | | | | |
| a) White carbon prepared from acid clay | 78.5 | 94.0 | 94.5 | 95.2 | 95.5 | 2.0 | 2.9 | below 5 | 2 | A | 10 |
| b) Silica gel for drying and adsorption agent use | 83.3 | 93.2 | 96.7 | 98.1 | 99.2 | 2.5 | 2.8 | below 5 | 2 | A | 10 |
| c) Silica hydrogel prepared from iron sand slag | 76.5 | 90.4 | 92.1 | 92.8 | 93.4 | 2.8 | 2.8 | below 5 | 2 | A | 10 |
| d) Reagent silica gel | 75.8 | 95.4 | 99.0 | 100.0 | 100.0 | 2.5 | 2.8 | below 5 | 2 | A | 10 |

Table 8

| Sample No. | Silicon, Titanium or Zirconium | Preparation Conditions of Phosphate | | | Flame-proofness Test (mm/6 sec) |
|---|---|---|---|---|---|
| | | Molar Ratio (n) $MO_2.nP_2O_5$ | Treatment Temperature (°C) | Treatment Time (hrs) | |
| 4 | Silicon | 0.3 | 300 | 2 | 13 |
| 8 | do. | 0.5 | 800 | 2 | 10 |
| 12 | do. | 1.0 | 400 | 2 | 8 |
| 14 | do. | 1.5 | 400 | 2 | 8 |
| 17 | Titanium | 0.3 | 250 | 2 | 15 |
| 21 | do. | 0.5 | 500 | 2 | 14 |
| 23 | do. | 0.7 | 500 | 2 | 13 |
| 25 | do. | 1.0 | 400 | 3 | 10 |
| 30 | Zirconium | 0.5 | 150 | 1 | 15 |
| 32 | do. | 1.0 | 150 | 1 | 10 |

EXAMPLE VI

In this example a description will be made of the white phosphatic pigments prepared using the various amorphous silicas.

As the amorphous silica, four classes are used: (a) acid-treated acid clay (composition 94.28 percent $SiO_2$, 1.49 percent $Al_2O_3$, 0.39 percent $Fe_2O_3$, ignition loss 3.36 percent) obtained by removing the acid-soluble basic components from a montmorillonitic acid clay by treating it thoroughly with sulfuric acid, (b) that obtained by roasting at 250°C. a silica gel which is commercially available for use as a drying and adsorption agent, followed by comminuting the resulting roasted product, (c) a silica hydrogel obtained by treating iron sand with dilute sulfuric acid to obtain a silicic content of the water-soluble component, pH of their 10 percent aqueous suspension, particle size and rate of aggregation are measured. Again, the rustproofness test by means of the saltwater spray method and the flameproofness test are carried out. The results obtained are shown in Table 9.

It can be seen that the pigments obtained are satisfactory white phosphatic pigments even when the various amorphous silicas are used as the starting material.

EXAMPLE VII

In this example, a description will be made of white phosphatic pigments, which have been prepared using the various silicates and earth minerals.

Four classes of silicates are used: aluminum silicate ($Al_2O_3.SiO_2$), calcium silicate ($CaO.SiO_2$), magnesium silicate and sodium silicate (0.3 $Na_2O.SiO_2$).

Four classes of natural earth minerals are used: as the stratified bonded material of phyllosilicic acid salts, the acid clays of kaolin and montmorillonite family are chosen, while as the non-natural silicates, zeolite is chosen, and as the natural noncrystalline silicic acid salts, diatomaceous earth is chosen. The several earth minerals are used either in their asobtained natural state or after calcining at 800°C.

In the case of the several silicates, commercially available orthophosphoric acid (JIS first grade 85.0 percent $H_2PO_4$ sp. gr. 1.69) is added to the silicates in amounts such as indicated in Table 10, and in the case of the earth minerals the orthophosphoric acid is added in a molar ratio of the silicic component to the phosphoric component of 1:0.5, the blending of the two starting materials being effected by bringing the components in thorough and intimate contact in a mortar.

After drying these several blends, they are calcined for 2 hours at 800°C., followed by wet-comminution, as in Example I, using methyl alcohol, and thereafter drying to obtain the several finely divided, white pigments.

As in Example VI, the properties of so obtained finely divided, white pigments are measured, and also the rustproofness test by means of the saltwater spray method and the flameproofness test are conducted on these pigments, with the results shown in Table 10.

EXAMPLE VIII

In this example, a description will be made of phosphatic white pigments, which have been prepared using various phosphorus oxyacids and the various salts of phosphorus oxyacids.

Five classes of phosphorus oxyacids were used; phosphoric acid anhydride ($P_2O_5$), metaphosphoric acid, pyrophosphoric acid, phosphorous acid and hypophosphorous acid.

Twelve classes of salts of phosphorus oxyacids are chosen: ammonium orthophosphate, disodium ortho- Table 10

| Starting Silicate and Earth Mineral | Amount of Admixed Phosphoric Acid | Degree of Whiteness (% reflectance) (Wavelength m$\mu$) | | | Water-Soluble Component | ph | Particle Size | Aggregation | Rust-proofness Test | Flame-proofness Test |
|---|---|---|---|---|---|---|---|---|---|---|
| Silicate | (ml/100 g) | 350 | 400 | 500 | (%) | | ($\mu$) | (%) | | |
| Aluminum Silicate ($Al_2O_3 \cdot SiO_2$) | 25 | 98.2 | 103.0 | 102.3 | 1.2 | 3.5 | below 5 | 2 | A | 13 |
|  | 78 | 87.2 | 98.0 | 100.2 | 1.3 | 3.0 | " | 3 | A | 13 |
| Calcium Silicate ($CaO \cdot SiO_2$) | 59 | 94.5 | 101.1 | 102.7 | 1.2 | 3.0 | " | 2 | A | 13 |
|  | 98 | 86.8 | 95.0 | 97.4 | 1.4 | 2.9 | " | 3 | A | 13 |
| Magnesium Silicate ($MgO \cdot SiO_2$) | 68 | 87.1 | 99.2 | 100.7 | 1.3 | 2.8 | " | 2 | A | 12 |
|  | 204 | 88.6 | 97.6 | 99.3 | 1.5 | 2.2 | " | 5 | A | 12 |
| Sodium Silicate ($0.3Na_2O \cdot SiO_2 0$. naOH 34.97 g/l $SiO_2$ 84.45 g/l | 4.9 4l/100ml | 75.8 | 95.4 | 100.0 | 1.7 | 2.6 | " | 2 | A | 10 |
|  | 11.6 4l/100 4l | 77.0 | 97.0 | 99.5 | 1.9 | 2.0 | " | 4 | A | 10 |
| Earth Mineral | | | | | | | | | | |
| Kaolin $SiO_2$ 79.35, $Al_2O_3$ 17.64, $Fe_2O_3$ trace, CaO 0.38, MgO 0.26, Ignition loss 3.34 | As-obtained 90 | 66.1 | 77.5 | 81.6 | 1.3 | 2.7 | " | 2 | A | 12 |
|  | Calcined product | 69.2 | 92.5 | 94.8 | 1.3 | 2.8 | " | 2 | A | 12 |
| Acid clay $SiO_2$ 78.65, $Al_2O_3$ 13.12, $Fe_2O_3$ 0.57, CaO 1.13, MgO 3.5, Ignition loss 3.15 | As- 90 | 43.5 | 59.8 | 72.3 | 1.2 | 2.8 | " | 2 | A | 12 |
|  | Calcined product | 63.7 | 89.7 | 92.7 | 1.2 | 2.8 | " | 2 | A | 12 |
| Zeolite $SiO_2$ 66.08, $Al_2O_3$ 11.92, $Fe_2O_3$ 0.40, CaO 2.03, MgO 0.04, $TiO_2$ 0.04, $Na_2O$ 2.07, $K_2O$ 2.05, Ignition loss 15.86 | As-obtained 75 | 49.2 | 60.7 | 72.3 | 1.3 | 3.0 | " | 2 | A | 13 |
|  | Calcined product | 73.0 | 87.0 | 87.8 | 1.3 | 3.0 | " | 2 | A | 13 |
| Diatomaceous earth $SiO_2$ 79.56, $Al_2O_3$ 6.37, $Fe_2O_3$ 3.03, CaO 0.16, MgO 1.13, Ignition loss 8.36 | As-obtained 90 | 21.3 | 34.2 | 49.2 | 1.1 | 2.7 | " | 2 | A | 12 |
|  | Calcined product | 56.6 | 90.8 | 95.9 | 1.1 | 2.8 | " | 2 | A | 12 |

It can be seen from the foregoing results that excellent results are obtained by the use of the various silicates and the various earth minerals in the preparation of the white pigment and also when the amount of the admixed phosphoric acid is varied in the range specified by this invention.

phosphate, sodium pyrophosphate, sodium hexametaphosphate, sodium metaphosphate, sodium tripolyphosphate, monopotassium phosphate, tricalcium phosphate, aluminum phosphate, zinc phosphate, sodium phosphite and sodium hypophosphate.

As the starting silicic component, the small aggregate silica xerogel used in Example I is used.

The finely divided silica (xerogel) used in Example I was used as the starting silicic component.

The two starting materials were thoroughly and intimately blended in a mortar in such a proportion that the molar ratio of $SiO_2$: $P_2O_5$ becomes 1:0.5. The blending of the components is carried out by adding water as the blending medium. After drying this blend, it is calcined for 2 hours at 800°C. When phosphorous acid is used as the phosphoric component in this case, it differs from the others in that it burns. The resulting calcined product is then wet-comminuted using methyl alcohol and then dried to obtain the several finely divided, white pigments.

As in Example 6, the properties of the so obtained several finely divided, white pigments are measured, and also the rustproofness test by means of the saltwater spray method and the flameproofness test are carried out on the pigments, with the results show in Table 11.

EXAMPLE IX

In this example, a description will be made of the silica, phosphoric acid, ammonia type white pigment, which is prepared using a xerogel of silica, phosphoric acid and ammonia as the starting materials.

The small aggregate silica xerogel prepared in accordance with the procedure described in Example I is used as the starting silica xerogel.

The commercial available orthophosphoric acid (JIS first grade 85 percent $H_3PO_4$, sp. gr. 1.69) is used as the starting phosphoric acid.

Ammonia water (25-29 percent) commercially available as an industrial chemical is used as the starting ammonia.

First, the ammonia water is thoroughly absorbed by the silica xerogel at room temperature. As a result of this operation, 11.5 percent by weight, calculated as $NH_4OH$, of the ammonia is absorbed by the silica xerogel. Even if the temperature of this ammonia-absorbed Table 11

| Class of Phosphorus oxyacid and Salt of Phosphorus oxyacid | Degree of Whiteness (% reflectance) (Wavelength mμ) | | | | Water-Soluble Component (%) | pH | Particle Size (μ) | Aggregation (%) | Rustproofness Test | Flameproofness Test |
|---|---|---|---|---|---|---|---|---|---|---|
| | 350 | 400 | 450 | 500 | | | | | | |
| Phosphoric acid anhydride ($P_2O_5$) | 85.8 | 92.7 | 92.9 | 93.6 | 2.6 | 2.2 | below 5 | 2 | A | 10 |
| Metaphosphoric acid ($HPO_3$) | 80.1 | 91.2 | 93.3 | 94.5 | 2.7 | 2.4 | " | 2 | A | 10 |
| Pyrophosphoric acid ($H_4P_2O_7$) | 87.5 | 100.5 | 102.0 | 103.1 | 2.7 | 2.6 | " | 2 | A | 10 |
| Phosphorous acid ($H_3PO_3$) | 78.6 | 101.1 | 100.9 | 101.6 | 2.5 | 2.4 | " | 2 | A | 10 |
| Hypophosphorous acid ($H_3PO_2$) | 40.8 | 80.6 | 83.5 | 85.8 | 2.5 | 2.4 | " | 2 | A | 10 |
| Ammonium orthophosphate (($NH_4)_2HPO_4$) | 86.0 | 97.3 | 98.6 | 99.9 | 2.6 | 2.4 | " | 2 | A | 11 |
| Disodium orthophosphate ($Na_2HPO_4$) | 94.0 | 104.6 | 104.1 | 105.1 | 1.7 | 3.0 | " | 2 | A | 12 |
| Sodium pyrophosphate ($Na_4P_2O_7$) | 90.0 | 103.7 | 103.8 | 104.3 | 1.9 | 2.8 | " | 2 | A | 12 |
| Sodium hexametaphosphate (($NaPO_3)_6$) | 65.3 | 85.3 | 88.4 | 90.6 | 1.8 | 2.8 | " | 2 | A | 12 |
| Sodium metaphosphate ($NaPO_3$) | 72.9 | 88.0 | 95.3 | 99.8 | 1.5 | 3.0 | " | 2 | A | 12 |
| Sodium tripolyphosphate ($Na_5P_3O_{10}$) | 90.6 | 100.7 | 100.9 | 101.9 | 2.3 | 2.8 | " | 2 | A | 12 |
| Monopotassium phosphate ($KH_2PO_4$) | 69.0 | 95.9 | 98.3 | 99.4 | 2.2 | 2.8 | " | 2 | A | 12 |
| Tricalsium phosphate ($Ca_3(PO_4)_2$) | 88.7 | 97.4 | 99.3 | 100.5 | 1.3 | 3.2 | " | 2 | A | 12 |
| Aluminum phosphate ($AlPO_4$) | 76.9 | 93.8 | 96.2 | 97.9 | 1.2 | 3.0 | " | 2 | A | 12 |
| Zinc phosphate ($Zn_3(PO_4)_2$) | 48.9 | 96.1 | 92.6 | 97.3 | 1.2 | 3.0 | " | 2 | A | 12 |
| Sodium phosphite ($Na_2HPO_3$) | 85.3 | 101.8 | 102.8 | 103.8 | 2.2 | 2.8 | " | 2 | A | 11 |
| Sodium hypophosphite ($NaH_2PO_2$) | 61.0 | 90.4 | 96.3 | 98.3 | 2.4 | 2.8 | " | 2 | A | 11 |

It can thus be appreciated from the foregoing results that excellent results are obtained in both the case where the phosphatic white pigment is prepared using the phosphorus oxyacids and the case where the pigment is prepared using the salts of the phosphorus oxyacids.

silica gel is raised up to the neighborhood of 600°C. under a dry atmosphere, the separation of ammonia is not noted, and further the differential thermal analysis results also show no endothermic peak within this temperature range.

Phosphoric acid is added to this ammonia-absorbed silica gel in an amount corresponding to one mol of $P_2O_5$ per mol of $SiO_2$. By the addition of ammonia water also and intimately blending the mixture, a slurried blend whose pH is about 9–9.5 is obtained. This blend is dried and dehydrated at about 80°C, and heated further for about an hour at 80°C. This is followed by wet-comminution of the product, as in Example I, using methyl alcohol, after which the ground product is dried. As a result, a finely divided, white pigment is obtained.

The X-ray diffraction analysis, differential thermal analysis and the analysis of the composition of the so obtained finely divided, white pigment are conducted, as well as measurement of the pH of its 10 percent aqueous suspension, content of the water-soluble component, rate of aggregation, particle size distribution are made. The flameproofness test is also carried out on this pigment.

By way of comparison, (A) ammonium polyphosphate, a commercially available flameproofing agent, and (B) the reagent diammonium phosphate [$(NH_4)_2HPO_4$] are chosen and tested for their properties and flameproofness, as described hereinabove.

The results obtained are shown in Table 12.

As the polyester resin, POLYMAL, the polyester produced by Takeda Chemical Company, is used.

70, 50 and 30 parts by weight of the silica-phosphoric acid-ammonia type white powder pigment prepared by the procedure described in Example IX are added respectively to 100 parts by weight of the foregoing polyester resin, after which 10 parts by weight of chlorinated paraffin (CP 70), 0.6 part by weight of cobalt naphthenate, 1.0 part by weight of a peroxide and 0.1 part by weight of dimethylaniline are added to each of the mixtures. On mixing the several mixtures with thorough stirring, they start to harden in about 5–7 minutes. While the mixtures are still in a fluid state, they are cast into sheets 3 mm in thickness and allowed to harden. The so obtained sheets are then tested for their flameproofness effect by the flammability test of ASTM D-635.

As the alkyd resin, the commercially available room temperature drying alkyd resin varnish is used. To 100 parts by weight of this varnish 50 parts by weight of the white powder pigment prepared by means of the procedure described in Example IX are mixed.

As the melamine resin, the butanol solution of butylated melamine, the precondensation product of melamine resin, is used. To this solution 50 parts by weight Table 12

| Sample | X-Ray Diffraction Analysis | Differential Thermal Analysis (0 – 600°C) (endothermic peak °C) | Analysis of Composition (formula from molar ratio) | pH of 10% Suspension | Content of Water-Soluble Component (%) | Aggregation (%) | Particle Size Distribution ($\mu$) | Flameproofness Test (mm/12 sec) |
| --- | --- | --- | --- | --- | --- | --- | --- | --- |
| Product of this example | X-ray diffraction pattern A-1 presented in specification | 193 | $SiO_2.P_2O_5.6 NH_3.3H_2O$ | 7.5 | 23.8, 0.5 | 4–0.5 | 8 | |
| Comparison A (ammonium polyphosphate) | $(NH_4)_{2.7}H_{1.3}P_2O_7$ | 224, 229 | $(NH_4)_{2.7}H_{1.3}P_2O_7$ | 4.4 | 14.7 | 45.5 | 100–10 | 10 |
| Comparison B (diammonium phosphate) | $(NH_4)_2HPO_4$ | 210 | $(NH_4)_2HPO_4$ | 8.2 | 63.9 | 100 | 100–10 | 15 |

It can thus be seen from the foregoing results that the finely divided, white pigment prepared in accordance with this example not only is superior in its flameproofness effect as compared with the similar white powders tested by way of comparison but also is a different substance with respect to its various properties. In addition, it excels as a pigment in its rate of aggregation, a property especially required of a pigment. Thus, it is seen that this white pigment is satisfactory for use as a flameproofing pigment.

EXAMPLE X

The flameproofness effect obtained when the silica-phosphoric acid-ammonia type white pigment prepared in Example IX is blended with the various resin will be described in this example. A commercially available polyester resin and, the alkyd, melamine and polyamide resins, which are usually commercially available as varnish resins for coating purposes are chosen.

of the white powder pigment prepared by the procedure described in Example IX are mixed.

As the polyamide resinous solution type, using isano oil, linseed oil and polyamide resin as the base, a varnish composition consisting of 100 parts by weight of a polyamide resinous solution, 100 parts by weight of isano oil, 100 parts by weight of linseed oil 40 parts by weight of chlorinated paraffin (70 percent Cl) and 0.5 part by weight of cobalt naphthenate plus lead naphthenate is used. 150 parts by weight of the white power pigment prepared by the procedure described in Example IX is admixed with the foregoing varnish composition.

These pigment-added resinous varnishes are applied to pieces of drawing paper and are dried by allowing to stand for 24 hours at room temperature in the case of the alkyd resin, by drying for 1 hour at 110°C. in the case of the melamine resin, and by allowing to stand for 24 hours at room temperature in the case of the polyamide resin. Film coatings of the several pigment-incorporated resins are thus formed on the pieces of paper.

The pieces of paper on whose surfaces the several film coatings have been formed are submitted to a flameproofness test as in Example I.

The results of this test are shown in Table 13.

Table 13

IN THE CASE OF POLYESTER RESIN

| Amount Added of White Pigment (parts) | Time Until Self-Extinguishment of Fire (min, sec) |
|---|---|
| 70 | 3 sec |
| 50 | 7 sec |
| 30 | 1 min 50 sec |

IN THE CASE OF THE VARNISH TYPE RESINS

| Class of Resin | Flameproofness Test (mm/12 sec) |
|---|---|
| alkyd | 17 |
| melamine | 4 |
| polyamide | 6 |

It can thus be seen from the foregoing results that satisfactory flameproofness effects are also demonstrated in the case where the white pigment obtained in accordance with the present invention is incorporated in the various resins and the resin so incorporated with the white pigment is either formed into a substrate or applied as a coating.

We claim:

1. A white pigment excelling in flame resistance as well as corrosion resistance, said white pigment consisting of a phosphate having the composition of the formula

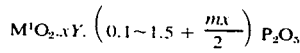

wherein
$M^1$ is an atom selected from the group consisting of silicon, titanium and zirconium,
Y is a member selected from the group consisting of a nitrogen-containing base selected from the group consisting of ammonia, urea, ammonium carbamate, guanyl urea, aminourea and biurea and an oxide of the formula $$M^2O_{n/2}$$

wherein $M^2$ is a metal selected from the group consisting of alkali metals, alkaline earth metals, aluminum, lead and zinc, and $n$ is the valence of said metal $M^2$,
$x$ is a positive number up to 6, including 0, and
$m$ is 1 when Y is said nitrogen-containing base and is $n$ when Y is $M^2On_2$;
said phosphate having a water solubility of 0.1–20 percent, said phosphate having a rate of aggregation of not more than 50 percent as defined by the following formula

wherein
$A$ is the weight of powder passing through a sieve of 100-mesh size,
$A'$ is the weight of this powder passing through the same sieve after standing for 24 hours at room temperature in air of relative humidity 90 percent, and
$Q$ is the rate of aggregation in percent.

2. The white pigment of claim 1 wherein said phosphate has a water solubility of 0.6 to 20 percent.

3. A white pigment excelling in flame resistance as well as corrosion resistance, said white pigment consisting of a phosphate of the formula

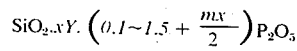

wherein
Y is a member selected from the group consisting of a nitrogen-containing base selected from the group consisting of ammonia, urea, ammonium carbamate, guanyl urea, aminourea and biurea and an oxide of the formula $$M^2On_2$$

wherein $M^2$ is a metal selected from the group consisting of alkali metals, alkaline earth metals, aluminum, lead and zinc, and $n$ is the valence of said metal $M^2$,
$x$ is a positive number up to 6, including 0, and
$m$ is 1 when Y is said nitrogen-containing base and is $n$ when Y is $M^2On_2$;
said phosphate having a water solubility of 0.1–20 percent, said phosphate having a rate of aggregation of not more than 50 percent as defined by the following formula $$Q = \frac{A-A'}{A} \times 100$$

wherein
$A$ is the weight of powder passing through a sieve of 100-mesh size,
$A'$ is the weight of this powder passing through the same sieve after standing for 24 hours at room temperature in air of relative humidity 90 percent, and
$Q$ is the rate of aggregation in percent.

4. A white rust preventing pigment consisting of titanium phosphate of the formula $$TiO_2 \cdot (0.2 \sim 1.5)P_2O_5,$$

said titanium phosphate having a water solubility of 0.1–20 percent, said phosphate having a rate of aggregation of not more than 50 percent as defined by the following formula

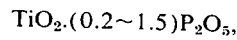

wherein
$A$ is the weight of powder passing through a sieve of 100-mesh size,
$A'$ is the weight of this powder passing through the same sieve after standing for 24 hours at room temperature in air of relative humidity 90 percent, and
$Q$ is the rate of aggregation in percent,
a 10 percent aqueous suspension of said titanium phosphate having a pH of not more than 3.5.

5. A white pigment consisting of zirconium phosphate of the formula $ZrO \cdot (0.4\sim1.0)P_2O_5$, said zirconium phosphate having a water solubility of 0.1–20 percent, said phosphate having a rate of aggregation of not more than 50 percent as defined by the following formula $$Q = \frac{A-A'}{A} \times 100$$

wherein

A is the weight of powder passing through a sieve of 100-mesh size,

A' is the weight of this powder passing through the same sieve after standing for 24 hours at room temperature in air of relative humidity 90 percent, and Q is the rate of aggregation in percent.

6. In a paint for preventing the rusting of metallic surfaces, said paint comprising a. a vehicle containing a coating film-forming base, and b. a rust preventing pigment, the improvement wherein said rust preventing pigment consists of a phosphate having the composition of the formula $$M^1O_2 \cdot xY \cdot \left(0.1\sim1.5 + \frac{mx}{2}\right) P_2O_5$$

wherein $M^1$ is an atom selected from the group consisting of silicon, titanium and zirconium, Y is a member selected from the group consisting of a nitrogen-containing base selected from the group consisting of ammonia, urea, ammonium carbamate, guanyl urea, aminourea and biurea and an oxide of the formula $$M^2O_{n/2}$$

wherein $M^2$ is a metal selected from the group consisting of alkali metals, alkaline earth metals, aluminum, lead and zinc, and $n$ is the valence of said metal $M^2$, $x$ is a positive number up to 6, including 0, and $m$ is 1 when Y is said nitrogen-containing base and is $n$ when Y is $M^2Oh_2$;

said phosphate having a water solubility of 0.1–20 percent, said phosphate having a rate of aggregation of not more than 50 percent as defined by the following formula $$Q = \frac{A-A'}{A} \times 100$$

wherein

A is the weight of powder passing through a sieve of 100-mesh size,

A' is the weight of this powder passing through the same sieve after standing for 24 hours at room temperature in air of relative humidity 90 percent, and Q is the rate of aggregation in percent, said phosphate being present in an amount of 1 to 50 parts by weight per 100 parts by weight of said coating film-forming base.

7. A method of preventing the rusting of metals which comprises applying to the surface of metals as an undercoating layer a paint containing a. a vehicle containing a coating film-forming base, and b. a white rust preventing pigment consisting of a phosphate having the composition of the formula $$M^1O_2 \cdot xY \cdot \left(0.1\sim1.5 + \frac{mx}{2}\right) P_2O_5$$

wherein $M^1$ is an atom selected from the group consisting of silicon, titanium and zirconium, Y is a member selected from the group consisting of a nitrogen-containing base selected from the group consisting of ammonia, urea, ammonium carbamate, guanyl urea, aminourea and biurea and an oxide of the formula $$M^2O_{n/2}$$

wherein $M^2$ is a metal selected from the group consisting of alkali metals, alkaline earth metals, aluminum, lead and zinc, and $n$ is the valence of said metal $M^2$, $x$ is a positive number up to 6, including 0, and $m$ is 1 when Y is a nitrogen-containing base and is $n$ when Y is $M^2O_{n/2}$;

said phosphate having a water solubility of 0.1–20 percent, said phosphate having a rate of aggregation of not more than 50 percent as defined by the following formula $$Q = \frac{A-A'}{A} \times 100$$

wherein

A is the weight of powder passing through a sieve of 100-mesh size,

A' is the weight of this powder passing through the same sieve after standing for 24 hours at room temperature in air of relative humidity 90%, and Q is the rate of aggregation in percent, said phosphate being present in an amount of 1 to 50 parts by weight per 100 parts by weight of said coating film-forming base.

* * * * *

UNITED STATES PATENT OFFICE
CERTIFICATE OF CORRECTION

Patent No. 3,892,577     Dated July 1, 1975

Inventor(s) SUGAHARA, ET AL.

It is certified that error appears in the above-identified patent and that said Letters Patent are hereby corrected as shown below:

In the claims, correct Claim 6 as follows:

Column 37, line 47, delete "$M^2Oh_2$" and insert -- $M^2O_{\frac{n}{2}}$ --

Signed and Sealed this thirtieth Day of September 1975

[SEAL]

Attest:

RUTH C. MASON
Attesting Officer

C. MARSHALL DANN
Commissioner of Patents and Trademarks